United States Patent [19]
Martin et al.

[11] Patent Number: 5,500,905
[45] Date of Patent: Mar. 19, 1996

[54] PATTERN RECOGNITION NEURAL NETWORK WITH SACCADE-LIKE OPERATION

[75] Inventors: Gale L. Martin; James A. Pittman; Mosfeq Rashid, all of Austin, Tex.

[73] Assignee: Microelectronics and Computer Technology Corporation, Austin, Tex.

[21] Appl. No.: 851,841

[22] Filed: Mar. 16, 1992

Related U.S. Application Data

[63] Continuation-in-part of Ser. No. 714,200, Jun. 12, 1991, abandoned.

[51] Int. Cl.⁶ .................................................. G06K 9/62
[52] U.S. Cl. .................. 382/157; 382/158; 395/21
[58] Field of Search ................................. 382/14, 15, 30, 382/34, 49, 156, 157, 158, 159, 155, 209, 218; 395/1, 21, 24

[56] References Cited

U.S. PATENT DOCUMENTS

| | | | |
|---|---|---|---|
| 3,873,972 | 3/1975 | Levine | 382/14 |
| 4,932,065 | 6/1990 | Feldgajer | 382/14 |
| 5,040,230 | 8/1991 | Takatori et al. | 382/15 |
| 5,058,179 | 10/1991 | Denker et al. | 382/14 |
| 5,058,180 | 10/1991 | Khan | 382/15 |
| 5,058,184 | 10/1991 | Fukushima | 382/14 |
| 5,060,278 | 10/1991 | Fukushima | 382/14 |
| 5,086,479 | 2/1992 | Takenaga et al. | 382/14 |
| 5,153,923 | 10/1992 | Matsuba et al. | 382/14 |

*Primary Examiner*—Joseph Mancuso
*Attorney, Agent, or Firm*—Gregory M. Howison

[57] ABSTRACT

A multi-layered pattern recognition neural network (30) is disclosed that comprises an input layer (50) that is operable to be mapped onto an input space that includes a scan window (32). Two hidden layers (54) and (58) map the input space to an output layer (34). The hidden layers utilize a local receptor field architecture and store representations of objects within the scan window (32) for mapping into one of a plurality of output nodes. Further, the output layer (34) is also operable to store representations of desired distances between the center of the scan window (32) and the next adjacent object thereto and also the distance between the center of the scan window (32) and the center of the current object. A scanning system can then utilize the information regarding the distance to the next adjacent object, which is stored in an output vector (40) to incrementally jump to the center of the next adjacent character rather than scan the entire distance therebetween. This is referred to as a saccade operation. Once the scan window (32) is disposed over the next object, a corrective saccade can be performed by utilizing the information output by the neural network (30) relating to the distance between the center of the scan window (32) and the current character. This information is output as an output vector (38) from the neural network (30).

39 Claims, 7 Drawing Sheets

PATTERN RECOGNITION NEURAL NETWORK WITH SACCADE-LIKE OPERATION

CROSS REFERENCE TO RELATED APPLICATION

This application is a continuation-in-part of U.S. patent application Ser. No. 07/714,200, filed Jun. 12, 1991, now abandoned, and entitled "Pattern Recognition Network".

TECHNICAL FIELD OF THE INVENTION

The present invention pertains in general to neural networks, and more particularly, to a multi-layered, feedforward neural network which is operable to scan a visual input field to simultaneously locate and classify objects on which it has been trained.

BACKGROUND OF THE INVENTION

An object recognition system, such as a system to recognize handwriting, typically requires separate development of a number of components. These components include a segmentation system to isolate the object, or character, from its background, a size normalization system to remove irrelevant variations, a feature extraction system to identify the features that discriminate the object from others, a classification system, and a system to improve classification accuracy by incorporating contextual constraints. One technique that can integrate a number of these steps is backpropagation neural networks, as described in D. E. Rumelhart, G. E. Hinton, and R. J. Williams, "Learning Internal Representations by Error Propagation" (in D. E. Rumelhart & J. L. McClelland, Parallel Distributed Processing, Vol. 1, 1986.

Application of backpropagation techniques to handwriting recognition initially focused only on the classifier component. In these type of systems, the input to the net is a feature vector and its target output vector, with the network doing the job of partitioning the feature space to enable classification. There have been a number of demonstrations that backpropagation techniques can also take over the job of feature selection and extraction. In these systems, the input to the network is a pre-segmented, size-normalized character array and its target output vector. The network jointly optimizes feature selection and classification, and thereby frees the system developer from time-consuming, iterative development efforts caused by experimenting with different feature sets. There is also some indication that generalization accuracy is relatively robust across variations in the size of the input image, and variations in the nature of the architecture. This work suggests backpropagation learning can handle a large range of variability in the input and therefore that this technique can be applied to integrating more of the heretofore separate components of recognition.

An input representation that can be used for this integration is the scanning window technique that has been applied in the domains of speech synthesis and speech recognition. In the speech domain an input window scans a signal that varies over time and enables the immediately adjacent context of a speech object to affect its classification by the system. One system is that described in T. J. Sejnowski and C. R. Rosenberg, "NETtalk: a parallel network that learns to read aloud", *The John Hopkins University Electrical Engineering and Computer Science Technical Report*, pages 663–672 (1986). This speech synthesis system is based on an automated learning procedure for a parallel network of deterministic processing units. After training on a corpus of informal continuous speech, it is capable of capturing most of the significant regularities in English pronunciation as well as absorbing many of the irregularities. Another similar technique used for speech recognition is described in A. Waibel, H. Sawai, K. Shikano, "Modularity and Scaling in large phonemic Neural Networks", *Advanced Telecommunications Research Institute Technical Report II-*0034, (1988). Another relevant technique is described in D. A. Pomerleau "Efficient training of artificial neural networks for autonomous navigation," *Neural Computation*, 3, 1991, pages 88–97. A backpropagation neural network is disclosed which can drive an autonomous land vehicle. The neural network is trained to keep the image of a road centered in its input window by making left and right turns of a steering wheel.

SUMMARY OF THE INVENTION

The present invention disclosed and claimed herein comprises a multi-layered neural network for pattern recognition. The network includes an input layer for mapping into a two-dimensional scan window, the scan window defining an input space that can be scanned over objects, and which input contains at least two adjacent objects. An output layer is provided that is comprised of at least a first output node to represent the presence of a desired object substantially centered in the scan window and a second output node to represent a desired distance between two adjacent objects. A hidden layer is provided having local receptor fields and interconnected with the input layer and the output layer for mapping the input layer to the output layer. The hidden layer provides a representation of the desired object when the desired object is substantially centered within the scan windows such that the first output node is activated in response thereto. The hidden layer also provides a representation of the desired distance when the desired object is separated from an adjacent object in the scan window by substantially the desired distance such that the second output node is activated in response thereto.

In another aspect to the present invention, the output layer is comprised as a plurality of the first output nodes corresponding to a plurality of objects that exist in a predetermined sequence and which can be disposed adjacent to each other and overlapping. The hidden layer contains a representation of each of the objects when substantially centered in the scan window, such that when any of the objects are centered within the scan window, activation of the associated one of the first output nodes results.

In yet another aspect of the present invention, the output layer comprises a plurality of the second output nodes corresponding to a plurality of desired distances between the two adjacent objects within the scan window, the desired distances being different along a single dimension. The hidden layer contains a representation of each of the desired distances between two adjacent objects within the scan window, such that when any of the desired distances exist between two adjacent objects within the scan window, activation of the associated one of the second output nodes results. The activation energy for each of the second output nodes varies in intensity from a maximum at the desired distance associated with the second output node to a minimum at a predetermined distance from either side of the desired distance in accordance with a predetermined profile. Therefore, a distance less than or greater than the desired distance results in an activation energy that is lower than the maximum.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

A portion of the disclosure of this patent document contains material that is subject to copyright protection. The copyright owner has no objection to the facsimile reproduction by anyone of the patent document or of the patent disclosure, as it appears in the Patent and Trademark office patent files or records, but otherwise reserves all copyright rights whatsoever.

Figure 1:
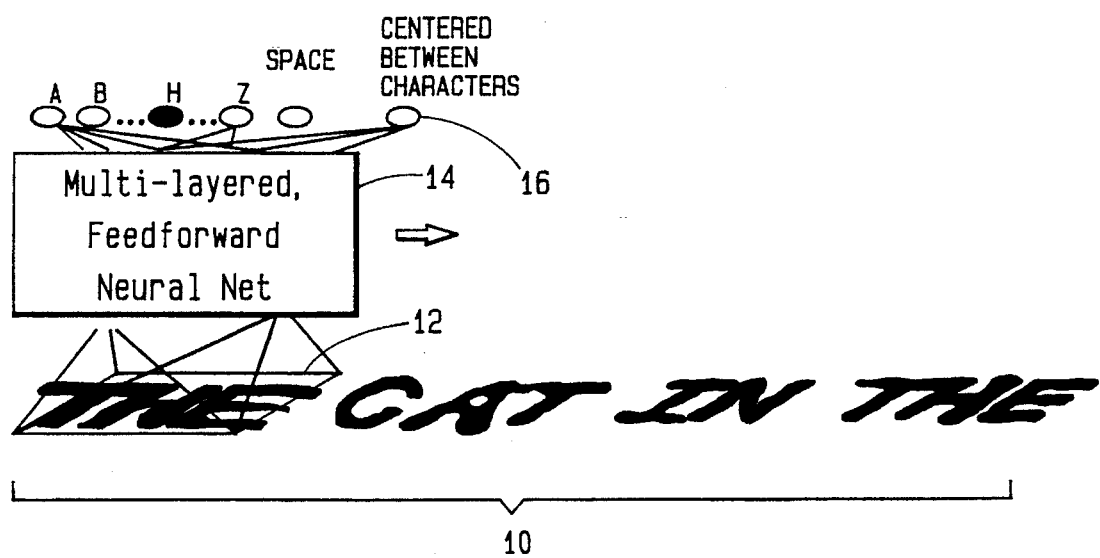
FIG. 1 illustrates a diagram of the neural network and scanning system of the present invention.

Referring now to FIG. 1, there is illustrated a simplified block diagram of the multi-layered feed forward network utilized with the precursor to the present invention, which is described in U.S. patent application Ser. No. 20,146, filed Jun. 12, 1991. A string of text 10 is provided that consists of characters that are oriented in a predetermined configuration. The object of this system is to scan this text and make decisions as to the sequence of letters. Alternatively, numbers or, in general, any type of object could be scanned. A scan window 12 is provided that is operable to be disposed over a string of characters and have the string of characters centered therein. The window 12 is operable to be scanned across the text 10 with the text 10 normalized within the scanning window 12. The network is operable to perform a pattern recognition on the objects or letters centered within the scan window 12. The objects or letters disposed around the centered object or character define how the object or character appears to the network.

A multi-layered feedforward neural network 14 is provided which has the input layer thereof connected to the input space defined within the scan window 12. An output layer 16 is comprised of a plurality of output nodes each of which correspond to a potential character or object. In the present example, the output nodes in the output layer 16 correspond to the letter of the alphabet, a space and an output that defines when the center of the scan window 12 is positioned between characters. It can be seen that the output node in output layer 16 associated with the "H" is illustrated in a dark shade representing that an "H" is disposed in the center of the scan window 12. In fact, the word "THE" is the word that is disposed within the scan window 12 with the "H" thereof centered. The network 14 was trained on a series of letters such that it recognizes the centered character in spite of the possible lack of recognition between adjacent characters, as will be described in more detail hereinbelow.

Figure 2:
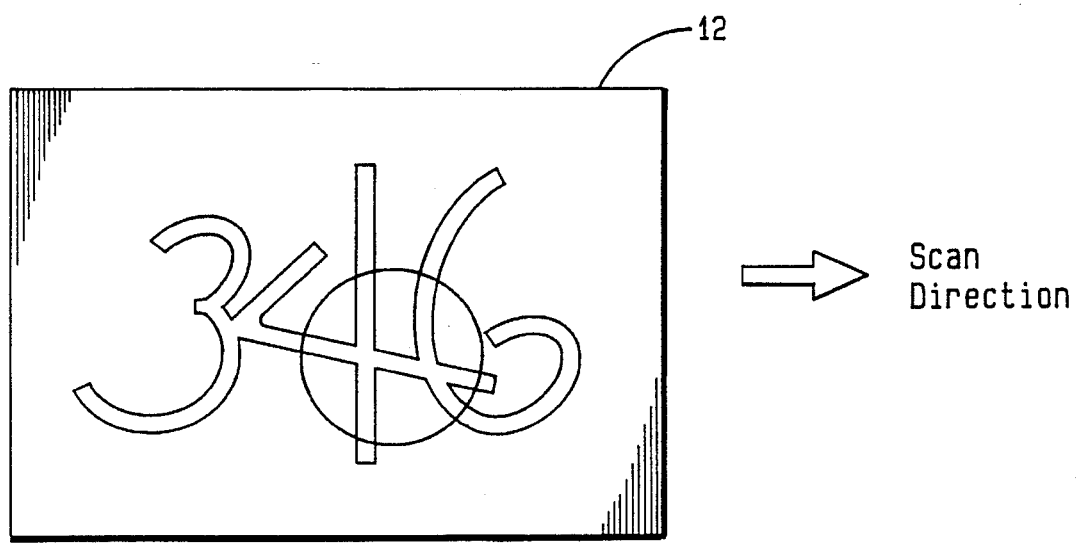
FIG. 2 illustrates an example of a scanning window.

Referring now to FIG. 2, there is illustrated an example of a trigram with the numbers "3", "4" and "6" in that order. However, it can be seen that the three separate numbers are not clearly separated or segmented, and they are somewhat distorted and overlapping. The network must first provide a segmentation of the characters which is done in the present invention by defining a character as being centered within the scan window 12. The number "4" is the centered number, and is the number that must be recognized. After recognizing that it is a centered character within the scan window 12, features of the number must be selected and extracted and then the number classified as to whether it is a 0, 1, 4 . . . 9. By training the network of FIG. 1 with any combination of the number "4", and associated numbers around the centered numbers, the features of a "4" can be recognized apart from other numbers when the character is centered.

Figures 3, 4:
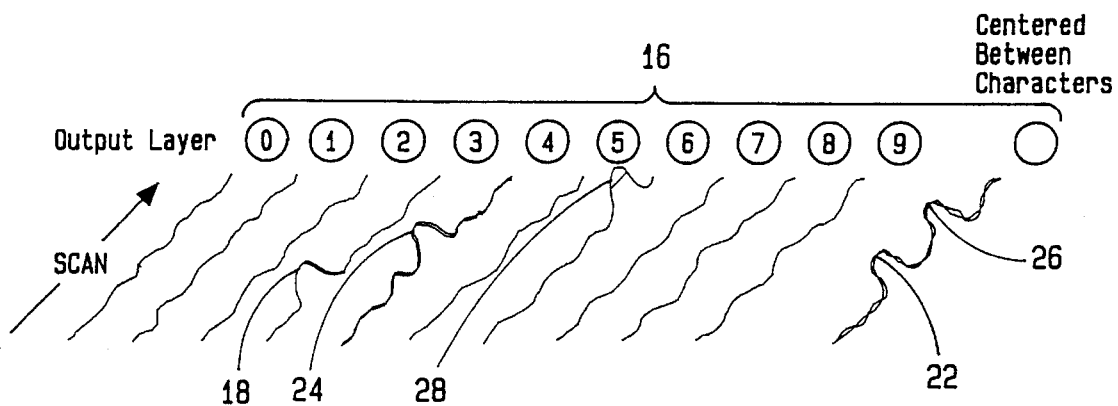
FIG. 3 illustrates a diagrammatic view of the output layer as a function of time.
FIG. 4 illustrates one example of the neural network.

Referring now to FIG. 3, there is illustrated a diagrammatic view of the output layers and the various outputs that would be derived therefrom when the trigram of FIG. 2 was scanned. As described above, there must be an output node for each possible character output. Since the example of FIG. 2 is numbers, the characters would range from 0 through 9 with an additional output node representing a space between characters or the center of the characters. It can be seen that as the trigram of FIG. 2 is scanned, the first output node that will have a high activation energy would be the one associated with the number "3". This will result in a peak 18 that represents a relatively high activation energy over the basic output level which can be represented by noise. Typically, a decision is not made until the activation energy rises above a predetermined threshold. Prior to scanning the "3", the output node associated with the space between characters would have a relatively high activation energy, as represented by peak 20. After the "3" has been scanned, due to its being centered in the window, the next position that would be centered in the window would again be a space between the characters, which would be represented by a peak 22 in the output node associated with that feature. As the window 12 is scanned further across the trigram of FIG. 2, the "4" will become centered in the window and a peak 24 will show up in the output node associated with the number "4". A second peak 26 will then occur when the space between the "4" and "6" in the trigram of FIG. 2 is centered in the scan window 12, and then a peak 28 will show up in the output node associated with the number "6" when the "6" is centered in the scan window 12 of FIG. 2.

The system of FIG. 1 utilizes a single backpropagation network with an enlarged input field to recognize each letter in the context of its surrounding letters in a string, this context comprising the information that exists within the scan window 12. The system avoids the need to segment characters prior to recognizing them, and also applies visual, contextual constraints to improve the recognition accuracy. Therefore, the window 12 must be wide enough to include several letters of a string or objects to provide this contextual information, and a target vector representing what is in the center of the window for each input. Normalization of the input string is based on a fixed vertical size of the field, or on the basis of other indicators of the vertical extent of the string of text (or objects). As the window scans along a text line (or the text is scanned under the window), the window will become centered on a character or a space or between two characters. Therefore, it can be seen that there is no need to explicitly segment the characters, since pattern recognition is defined as recognizing what is in the center of the window as opposed to segmenting the characters and then extracting the features therefrom.

The peripheral visual information of the window, the visual context, aids recognition to the extent that it is sufficiently redundant to constrain the recognition decision, this being a function of the learning of the network. There are three types of redundancy that are useful during learning and by which the network can optimize classification. They are: 1) regularities in the way individual characters look, 2) regularities in the sequences of letters, and 3) regularities imposed by the differential likelihood of occurrence of individual characters. To accurately reflect handwritten English text, for example, the training set should be drawn from a large and representative sample of writers writing a large and representative sample of English text. However, it should be understood that any type of object that is capable of existing in a pattern and which can be recognized thereby could be utilized. In the present examples described hereinbelow, English text is primarily utilized, which training set utilizes either individual or isolated uppercase hand-printed letters, and then utilizing an English trigram frequency table to reflect local sequence irregularities in English text. The inputs to a network then correspond to constructed images of these trigrams.

In a first example utilizing the system of FIG. 1, hand-printed letters were collected from 118 people writing isolated letters using a stylus digitizer. The set was first divided into a training set of 6000 training samples and 2368 test samples, with the two sets containing samples from different people. Within these sample sets, letter probabilities were roughly equivalent. Each set was then sub-divided to form 26 pools, each containing the samples of one of the letters "A" through "Z". The stylus collects a sequence of x-y coordinate pairs at 200 points per second at a spatial resolution of 1000 points per inch. The temporal sequence representation for each character is converted to a size-normalized bitmap array using a size normalization factor based on whichever of the two axes, horizontal or vertical, has the maximum extent. This method preserves the original aspect ratio of the characters. The character arrays all have the same height and width, but the characters within the arrays show some variation in height or width. Each bitmap array is then blurred through convolution with a gaussian distribution. Early experiments in our laboratory reveal that blurring improves generalization. The result of these operations is that each character is represented as a 15×24 grayscale image with pixel values ranging from 0 to 1.0. In addition to the A–Z pools, there was also a space pool containing one sample of a 15×24 array composed of all zeroes.

Trigrams of these letters were formed by drawing three letters from these pools in a sequence and with a frequency determined by a table reflecting the frequencies of trigrams (letter triplets) in a corpus of about one million words from common English text. This is described in Solso, Barbuto & Juel, "Bigram and Trigram Frequencies and Versatilities in the English Language," *Behavior Research Methods & Instrumentation*, 1979, 11, pp. 475–484, which is incorporated herein by reference. In the following, the term "letter" should be interpreted as referring to either one of the 26 letters or a "space". The trigram frequency table does not contain the frequencies of trigrams containing spaces (e.g. _AA, AA_, A_A), which would occur as a net scans along the string. Frequencies for these "space"-including trigrams were estimated as follows. A positional bigram frequency table was used to estimate frequencies of the first two types. (This is described in Solso and Joe, "Positional Frequency and Versatility of Bigrams for Two Through Nine English Words," *Behavior Research Methods & Instrumentation*, 1980, 12, 297– 343.) This table includes the frequencies of pairs of letters as they appear at the beginning and ends of words (e.g., _AA, and AA_, respectively). These frequencies were simply added to the trigram frequency table because they were collected from the same corpus as the trigram frequencies and so the relative probabilities were retained in the frequency values. The probabilities of trigrams having space in the middle (e.g., A_A) were estimated by using the frequency for each letter as it appears in the first and last positions in words, converting these frequencies to probabilities (by dividing each frequency value by the sum of the frequencies across letters for the first or last positions), and then multiplying these probabilities for all pairs of letters in each of the two positions. The relative probabilities of these space-including trigrams to that of the original—those not including spaces—was estimated from the knowledge that the corpus contained about one million words. These relative probabilities were then re-converted to frequency values and added to the original trigram frequency table. One other goal was to enable the net to recognize isolated letters (_A_, _B_, etc.). The frequencies of these single letter trigrams was set at the frequencies of the individual letters, whatever their position within a trigram. The relative probabilities of this class of trigrams was arbitrarily set at 10% relative to the other trigrams, so that they could also be added to the original trigram frequency table.

The visual characteristics of the trigrams were created as follows. The letters and spaces in a trigram were first laid down in a 55×24 array, with the middle letter centered in the array. Between-letter spacing within a trigram was varied randomly over a range of 7 pixels. Character arrays could be separated by as much as 3 pixels, just touching, or be overlapping by as much as 3 pixels. Then a scanning window moved over the array to form the 41×24 input windows given to the net. Three different input arrays were created for each trigram. One input array was centered on a character or space and the other two were centered between characters by shifting the window about half the width of a character in the forward and backward direction. The positioning of the window on the 55×24 array included a random error of plus or minus one pixel in the horizontal dimension. More specifically, a random error of plus or minus one pixel in the horizontal dimension and Centered-on-Character input arrays were created by reading from the 55×24 array starting from a randomly selected column within the seventh to ninth columns, and proceeding for 41 columns. The centered-between characters input arrays were created by reading from the 55×24 array starting from a randomly selected column within the first three columns of the 55×24 array, or from a randomly selected column within the thirteenth to fifteenth column, and in both cases proceeding for 41 columns. No trigrams were continuously selected and corresponding input arrays created during training, so the net presumably never trained on the same image more than once. FIG. 4 presents samples of the Centered-on-Character input windows. Training and test input windows were created in the same way, except that the test sets remained constant, and a separate set of letter pools collected from different people were used. There were two types of test sets. The mixed-sample test set consisted of 2400 samples of both the Centered-on-Character and Centered-Between-Characters types of input arrays in a 1-to-2 proportion with respect to each other. The other test set consisted only of 2400 Centered-on-Character input arrays.

Figure 5:
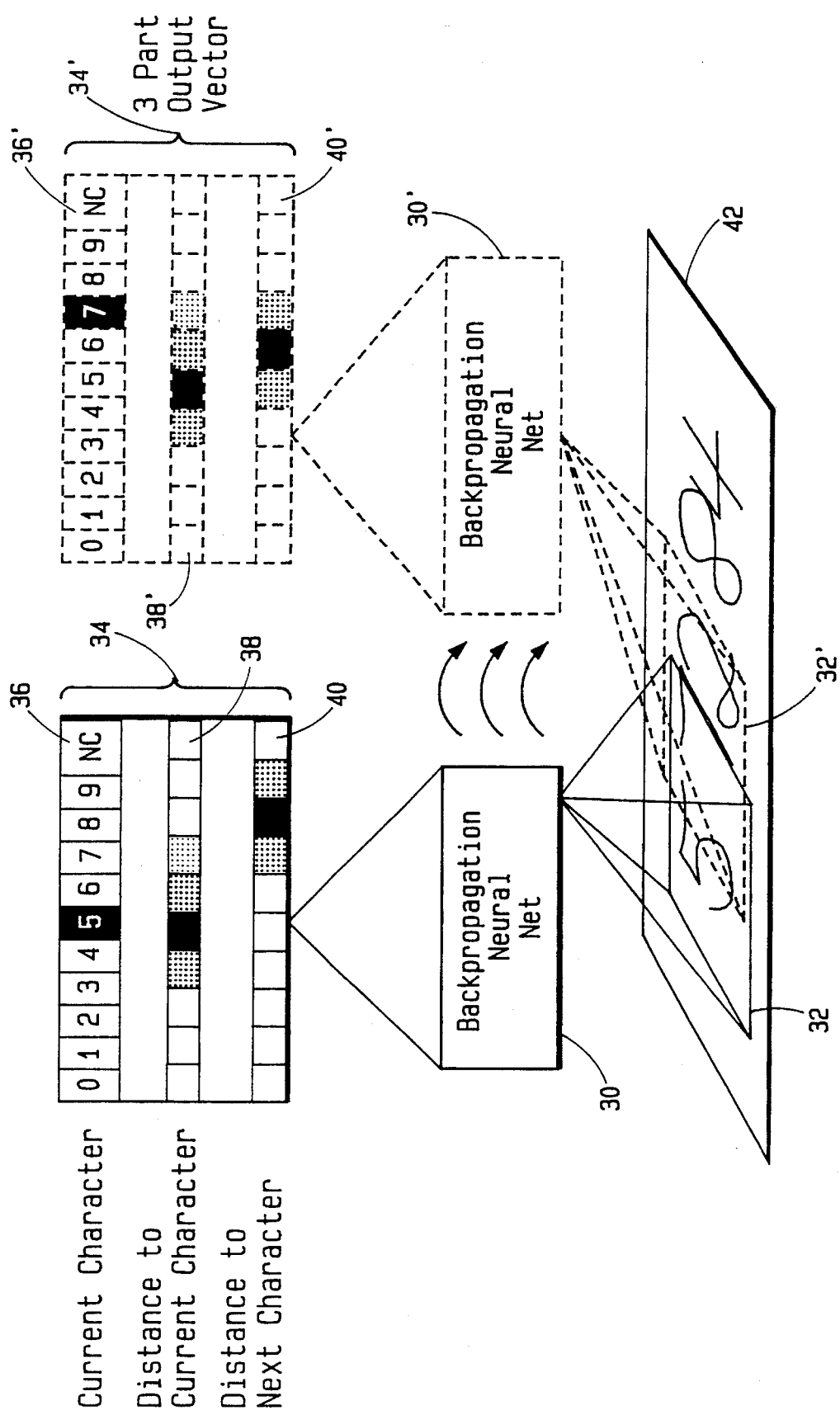
FIG. 5 illustrates a detailed diagram of the architecture incorporated into the neural network.

Referring now to FIG. 5, there is illustrated a simplified block diagram of the multi-layered feedforward network utilized in the preferred embodiment. As was the case with the system of FIG. 1, a backpropagation neural network 30 is provided that has the input layer thereof connected to a scan window 32. The scan window 32 is operable to be scanned over a sequence of image objects, which in the example illustrated in FIG. 5 is a series of numbers "5", "7", "2", "8" and "4." The backpropagation neural network has an output layer represented by a reference numeral 34. The output layer 34 has a plurality of nodes that represent three output vectors, output vector 36, an output vector 38 and an output vector 40. The output vector 36 represents the characters which, in the present example, are numerals from 0–9. Therefore, there are ten output nodes, one associated with each character and, additionally, a node representing when a character is not centered within the scan window 32. Whenever a character corresponding to one of the numerals 0–9 is centered within the window, the particular output node will have a relatively high activation energy and this will represent the existence of that character or a relatively close representation thereof centered within the scan window 32. Whenever no character is centered within the window, i.e., the scan window is disposed between two characters, the NC node will be activated.

The output vector 38 represents the distance to the current character. As will be described hereinbelow, it is desirable to have the character centered within the scan window 32 prior to making a decision as to what the character is. If the character were not centered, there might be an ambiguity between two adjacent characters, which ambiguity does not exist if the character is centered. As will be described hereinbelow, the output vector 38 has a plurality of output nodes, each representing a relative distance to the current character. If the activation of the centermost one of the output nodes in the output vector 38 has the highest activation energy, this indicates that the character is centered. Nodes to the left of this center character represent the distance to the character as being slightly to the left of center, and nodes to the right to the centermost node in output vector 38 represent the character being slightly to the right of the center.

The output vector 40 represents the distance from the current character to the next character and this output vector is comprised of a plurality of output nodes with the most extreme left output node representing a relatively small distance to the next character and the output node on the extreme right of the output vector 40 representing the character as being a distance of one-half of the width of the scan window 32 away from the current character. The limitation of the half window width as the "reach" of the output vector 40 is utilized in the preferred embodiment, but is in no way any limitation. Further, the output vector 40 represents only the distance to the next adjacent character. Systems could be developed wherein additional output vectors could represent the distance to a character disposed two positions away, a character disposed three positions away, etc.

The output vector 40 is utilized by the system to provide the scanning system with information to allow it to move directly to the next character as opposed to scanning between characters. Therefore, once a character has been recognized, the scanning system automatically jumps to the next character in accordance with the information output by the output vector 40. This jump to the next character is represented by a phantom line backpropagation network 30' and an output layer 34' that contains a new output vector 36', a new output vector 38' and a new output vector 40'. The output vectors 36'–40' in the output layer 34' represent another position of a scan window 32 as scan window 32'.

Figure 6:
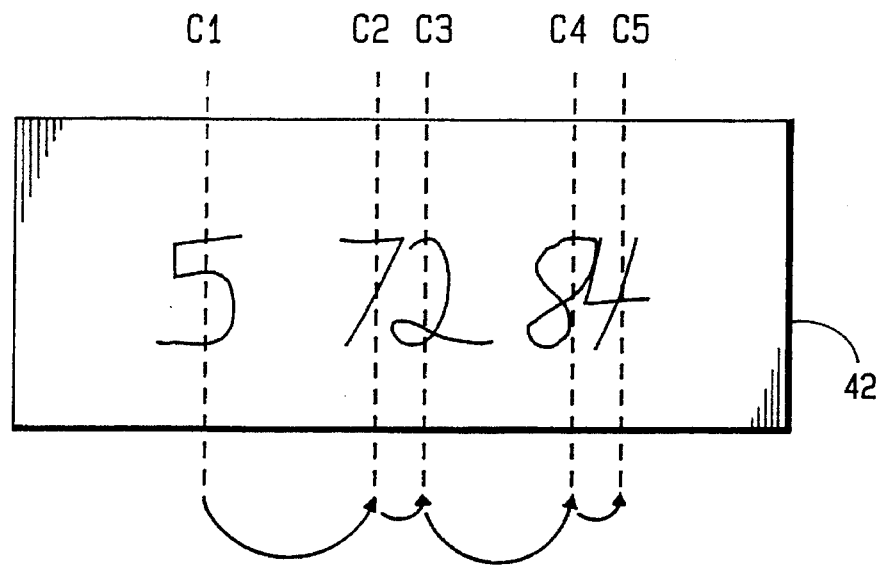
FIG. 6 illustrates the objects space of the network of FIG. 5.

The network of FIG. 5 is operable to scan the window 32 over an object space 42. The object space 42 is illustrated in FIG. 6. It is comprised of five numerals in the sequence "5", "7", "2", "8" and "4." The scan window 32 illustrated in FIG. 2 is centered over the numeral "5." It can be seen that the output node associated with the numeral "5" in the output vector 36 has the highest activation energy, thus indicating that the numeral within the scan window 32 is probably the numeral "5." In addition, the output vector 38 indicates that the character is centered within the scan window 32, thus increasing the probability that it is the numeral "5." Additional information is provided by the output vector 40 which shows the distance to the next character. After a decision has been made, the scanning system will jump to the next character in accordance with the information output by output vector 40. This will result in the outputs represented in the three part output vector 34'. The object that is within the scan window 32' in the center thereof is the numeral "7." It can be seen that the output vector 36' shows the highest activation energy for the numeral "7" and the output vector 38' indicates that the information in output vector 40 was correct and that the object is correctly centered within the scan window 32'. The output vector 40' indicates the distance to the next object, which is the numeral "2." It can be seen with reference to FIG. 6 that the numeral "2" is closer to the numeral "7" than was the numeral "5." As such, one would expect the distance indication by the output vector 40' to be less than the distance information indicated by the output vector 40, which is the case. The incrementing operation is continued for the next sequential objects within the scan path of the window 32.

The operation described above with reference to FIGS. 1 and 6 is referred to as that of a saccade system for recognizing machine printed characters. Saccade is the technical term used to describe the ballistic movements of the human eye as it shifts position to a new focus point. In a biological system, this operation comprises a jump to the general area of the object followed by a corrective saccade which is a series of small movements to center the focal point of the eye on the object itself. Therefore, the eye would normally move in large jumps from one object of interest to another object of interest and then use corrective saccades to position the eye directly on the object. In a similar manner, the system of the present invention provides information to allow a scanning system to have focal points that are defined as the centers of the scanned objects with the scanning operation from object to object done in "jumps" to the next focal point in a saccade manner. As will further be described hereinbelow, a corrective saccade is also provided utilizing the output vector 38.

Figure 7:
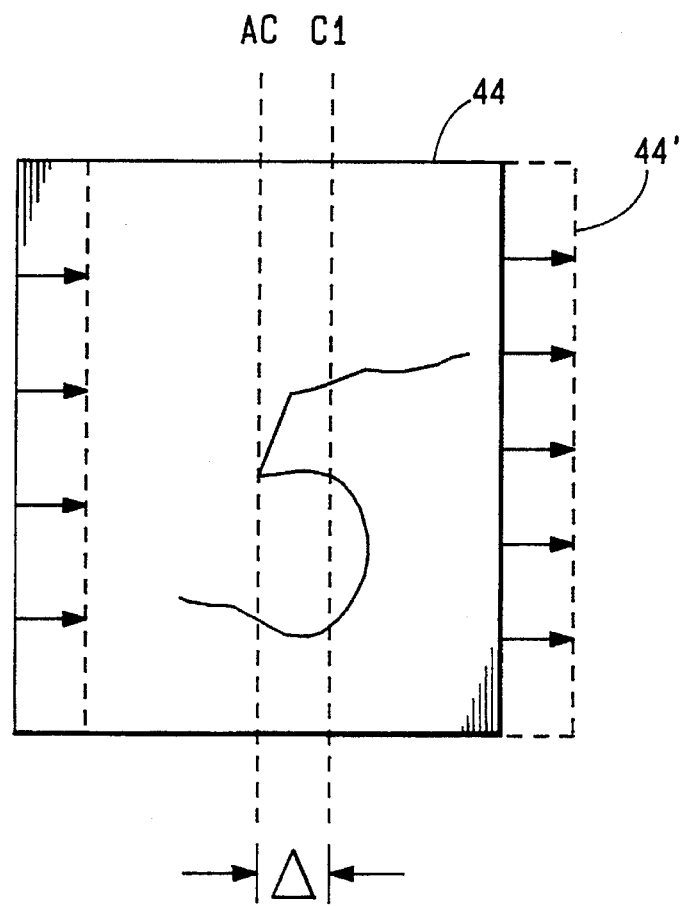
FIG. 7 illustrates a detail of the corrective saccade operation for a single object.

With reference to FIG. 7, the corrective saccade operation will be described. If the information in the previous scan operation resulted in exact information being output by the output vector 40 relating to the distance of the next character, an ambiguity may result due to the fact that the current character was not precisely centered within the window. If, for example, it was centered between two characters, an indecision might result, depending upon how strong the activation energy of either character were. In the previous system described in the parent application to the present application, it was necessary to completely scan over the image with a fixed-increment shift of several pixels, for example, three, with the neural network executing a forward pass at run-time for each shift. The information would then be analyzed in parallel. With the system of the present invention, it is only necessary to jump to the predicted center of the next character and then make a decision as to which character is indicated, by examining the activation energies of the output nodes in the vector 36. However, by having associated with this output the information in the output vector 38, a determination can be made as to whether the prediction made by the output vector 40 in the previous scan prior to the jump was correct. If not, a minor correction can be made to more closely center the character, thus increasing the probability of an accurate decision. This is illustrated wherein the window is first defined by a scan area 44 having a center referred to as "AC" and the center of a character referred to as C1. The centers of the scan window 44 and the character are not the same and they differ by a delta. A corrective saccade is then made and the scan window 44 is moved to a position indicated as scan window 44'.

Figure 8:
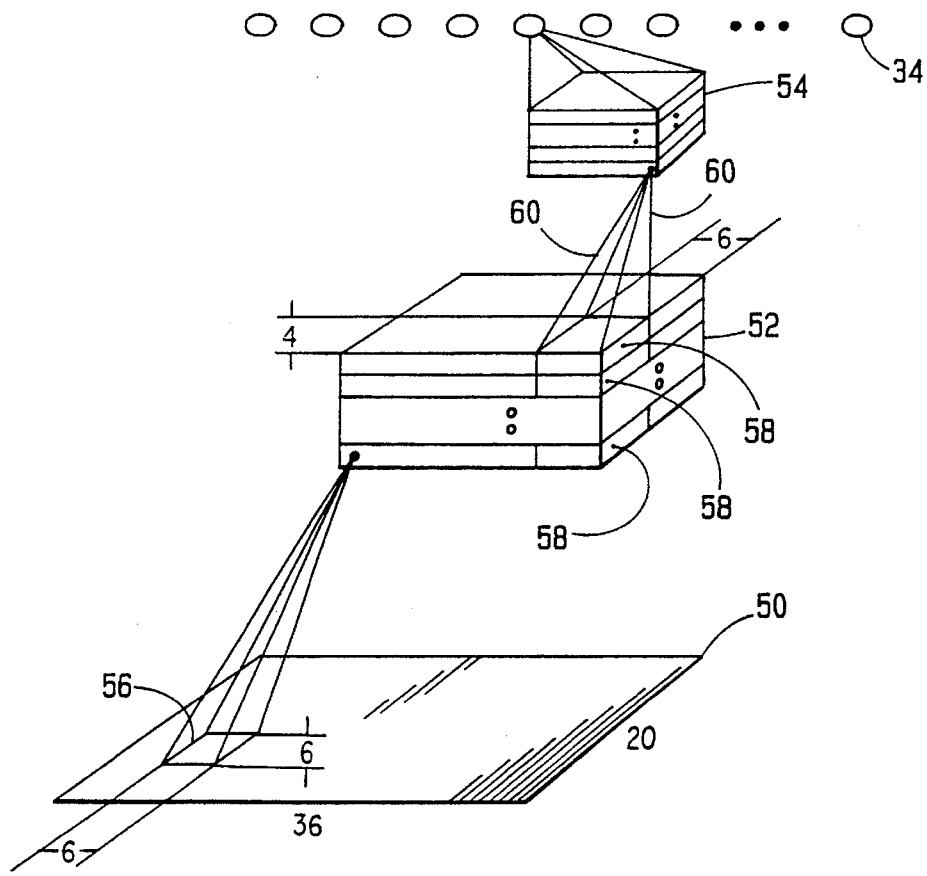
FIG. 8 illustrates a blocked diagram of the network architecture utilizing the preferred embodiment.

Referring now to FIG. 8, there is illustrated a block diagram of the network architecture utilized in the preferred embodiment of the present invention. The network architecture utilizes an input layer 50 that is comprised of 720 nodes that are arranged in a 36×20 gray scale array for each scan window 32 such that the input layer 50 can be mapped onto the input space of the window. The hidden layers are comprised of a first hidden layer 52 and a second hidden layer 54. The first hidden layer contains approximately 2,304 nodes and can be visualized as a 16×8×18 cube, where each 16×8 slice corresponds to a select single group of hidden nodes and there are eighteen different slices, each slice corresponding to a single group of hidden nodes, each group or slice representing a feature. Each node has associated therewith a 6×6 receptive field 56 in the input layer 50. The receptive field within a group of nodes within the hidden layer 52 have randomly-initialized, but shared weights that result in equivalent feature detectors developing across the spatial extent of the input array. Adjacent receptive fields are offset by two pixels in the horizontal and/or vertical dimensions within the input space, bias values not being shared. The second hidden layer 54 contains 324 nodes and can be visualized as a 6×3×18 cube, though the nodes within an 6×3 slice, there being eighteen slices, do not share weights. Each node receives projections from local receptive fields 58 of the size 6×4×18 within the first hidden layer 52. These projections are illustrated by lines 60. Therefore, there is a connection between the 6×4×18 local receptive fields within each of the slices of the hidden layer 52 and each of the nodes in the second hidden layer 54. Each of these local receptive fields on the first hidden layer 52 therefore project to eighteen hidden nodes in the second hidden layer. Weights are not shared in the second hidden layer 54, because shared weights would inhibit the position sensitivity needed to determine what is centered in the input window. Therefore, the second hidden layer 54 has local receptive fields that are not shared. Local receptive fields with shared weights are generally described in D. E. Rumelhart, G. E. Hinton & R. J. Williams, "Learning Internal Representations by Error Propagation" (in D. E. Rumelhart & J. L. McClelland, *Parallel Distributed Processing,* Vol. 1, 1986), which document is incorporated herein by reference. The primary difference is that the Rumelhart paper is a position invariant design with only one hidden layer. In the architecture of FIG. 8, the local tiered structure is only contained within the first hidden layer 52 and not within the second hidden layer 54.

The output layer 34 is global in that each of the nodes associated with the output layer 34 is connected to each of the nodes within the second hidden layer 54. Of course, various interconnect schemes could be utilized to minimize these interconnects.

During training of the network, a backpropagation method is utilized, which is conventional. The field images in the training database are labeled by a human, who identifies what characters are in the field and locates the horizontal centers of each character in the field for each of the training set images. This information is utilized to generate target output values for training. During training, the input window of the neural net scans horizontally over a field image in steps of approximately three pixels, starting at the left edge and moving to the right. At each step, there is an input image, corresponding to the input window positioned over a portion of the field image, and a target output vector that defines what the window is currently centered on and where it should jump to next. More specifically, the output vector for the neural network consists of three parts: 1) the category of what the input window is currently centered on, 2) the distance from the center of the window to the current character (this utilized in making a corrective saccade), and 3) the distance from the current character to the next character (this utilized in making a saccade to the next character).

Referring to FIG. 5, the first category, that defining what the neural net is currently centered on, is represented by the output vector 36 and consists of one node representing the output category and one node representing the state in which the neural net is not centered on any character. The second category, that relating to the distance to the current character, is represented by the output vector 38 and is operable to encode a distance value that can be positive, (i.e., the current character is to the right of the center of the window), negative, (i.e., the current character is to the left of the center of the window), or zero (i.e., the current character is centered at the center of the window). The absolute value of this distance cannot exceed one-half of the width of the window. The third category, that relating to the distance of the next character, is represented by the output vector 40 and is operable to encode a value that can only be positive, and cannot exceed one-half the width of the window. The distance values are encoded through a hyperacuity distribution representation scheme, this being referred to in John Moody and Christian Darken, *Learning with Localized Receptive Fields,* Research Report Yaleu/DCS/RR-649, September 1988 and Pierre Baldi and Walter Heiligenberg, *How Sensory Maps could Enhance Resolution through Ordered Arrangements of Broadly Tuned Receivers,* Internal Publication, both of which references are incorporated herein by reference.

Figure 9:
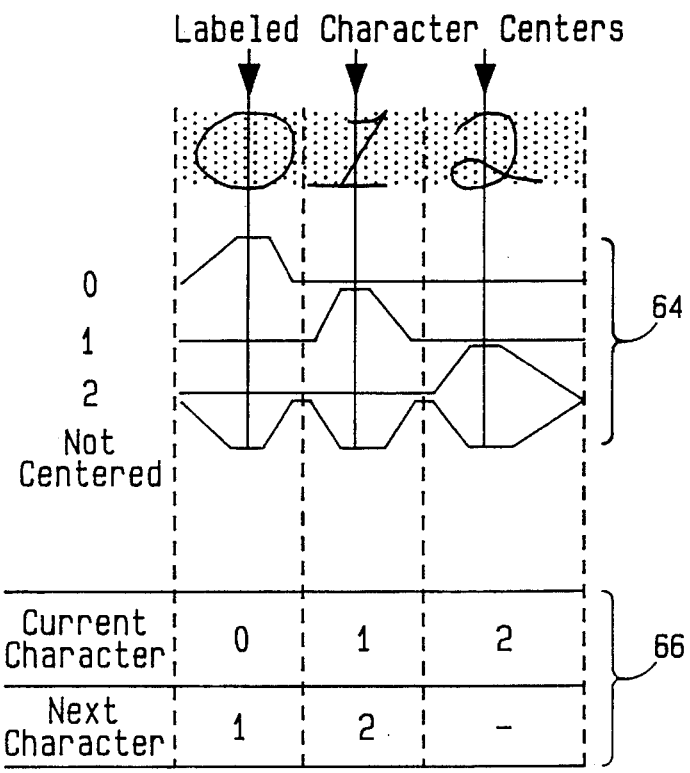
FIG. 9 illustrates the training procedure in the preferred embodiment of the present invention.

With reference to FIG. 9, the training procedure will be described in more detail. The three characters taught to the system are a sequence of three numbers, "0", "1" and "2." For each number, a trapezoidal target activation function is provided for the category output nodes, as indicated by reference numeral 64. The horizontal positions of each of the activation functions correspond to the center of the input window. For example, when the input window is centered over the labeled character center for the "0" object, the target output node for the "0" node takes on its maximum value, usually a value of "1.0." The actual activation values of these category nodes are determined by a trapezoidal or saw-tooth function. This function depends on the positions of the labeled character centers and the positions half-way between the labeled character centers. The width of the plateaus in the saw-tooth activation function is approximately 30% of the distance between a character and its neighboring character. The slopes of the trapezoidal activation function are determined by the distance between the characters, such that the slope will be sharper for closer characters.

The portions of the target output vector that identify the distance to the current and next character require specification of the current and next character at every point along the horizontal dimension of the field image. As illustrated in FIG. 9, the points of change for current and next character fall at the positions half-way between the labeled character centers. The corresponding location of the next and current characters are determined by their labeled character centers. The largest jump possible for this system is one-half of the width of the input window. Thus, if an input window contains no characters, or no next character, the target next-character distance corresponds to one-half of the window width. Therefore, during training, each position that is scanned represents a value for the activation energy for each of the output character nodes associated with output vector 36, a value for each of the output nodes in the output vector 38 relating to the distance of the current character value and an output value for each of the output nodes in the output vector 40 relating to the distance of the next character values. With respect to the output vector 40, this is a function of how close the next character is to the center of the scan window. During training, complete training would require the system to be trained for all arrangements of a given character and adjacent characters. For example, in the illustration of FIG. 9, the network will be trained for the character "0" with the next adjacent character being substantially next to the current character and touching that character and also disposed apart therefrom by at least one-half window width.

Figure 10A:
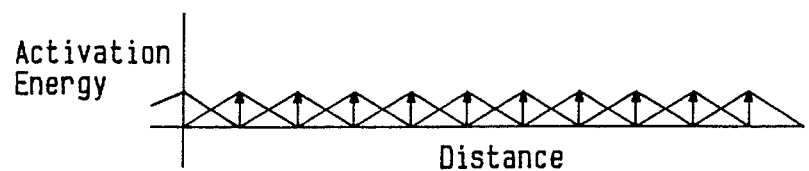
FIGS. 10a and 10b illustrate diagrammatic views of the activation energies before the output nodes of the neural network.
Figure 10B:
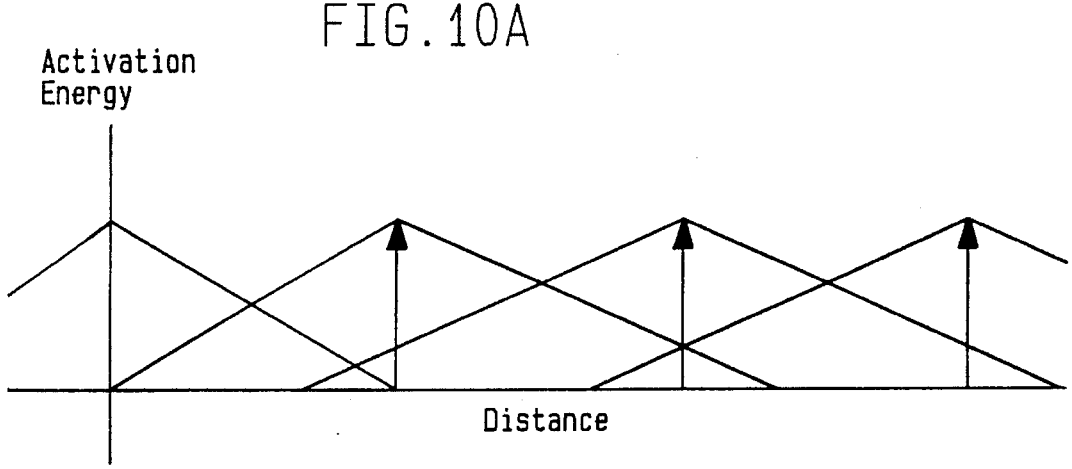

Referring now to FIGS. 10a and 10b, there is illustrated diagrammatic views of the activation energies for the ten output nodes of each of the output vectors 38 and 40. Each of the output vectors 38 and 40 has, in the preferred embodiment, ten nodes. Each of the nodes has associated therewith a triangular shaped activation energy that represents a plurality of adjacent pixels along the one dimensional distance line, each pixel representing a unit of distance. For example, if the width of a window were 30 pixels, the peak activation energy for each of the nodes would represent one of those pixels along that single dimension. If the distance value were 15 pixels, this might occur at the peak of the activation energy for the fifth node within the given output vector. However, if the distance value were 14 pixels, this would also activate the node but to a lesser degree. Additionally, the adjacent nodes would also be activated, as the activation energies are designed to overlap. By activating a number of adjacent nodes at varying levels, a decision can be made as to the actual distance, and this decision can be made with less nodes. The alternate to this approach would be to provide one node for each pixel, the pixel being the highest level of resolution. Therefore, for a 30 pixel window, 30 nodes would be required. Further, if the window was a 100 pixels, 100 nodes would be required. It can therefore be seen the hyperacuity system of the present invention results in the use of less nodes to provide the same information.

With reference to FIG. 10b, four nodes are illustrated with their activation energies illustrated with a saw-tooth or triangular activation energy. The "tails" of each of the activation energy responses overlap with the center of the previous node. Therefore, each node is represented by an upright arrow at the center thereof, i.e., at the peak activation energy, with each node representing a different number of pixels along the distance dimension. It can be seen that when the distance value is disposed equi-distant between the values associated with two nodes, the activation energy for the two adjacent nodes would be equal. This will be recognized by the scanning software as being at a pixel equally distanced therebetween. Further, it may be desirable to have the tail of the adjacent pixel activation energy response overlap the center of the one pixel location in order to reduce any ambiguities. If this were so, a distance value that was slightly to the left of the center of the activation energy for a given node would result in an activation energy output by that node, an activation energy output by the node immediately to the left of it and an activation energy output by the node immediately to the right of it. This would allow a determination to be made as to whether the distance value was to the left or to the right of the particular node having the highest value. Notice also that the peak of the activation energy for the left most node corresponds to a zero distance value, with the left most portion of the triangular function falling over what would be negative distance values. This node is positioned here to ensure that each point along the zero-to-positively valued distances will be represented by an equal number of nodes.

Figure 11:
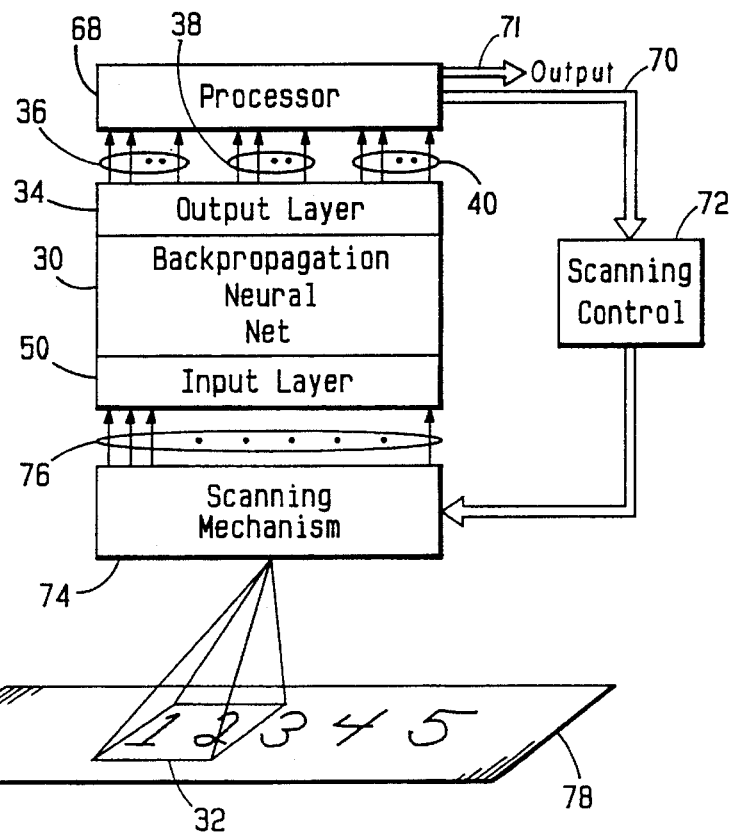
FIG. 11 illustrates a simplified diagram of the overall system for performing the scanning operation.

Referring now to FIG. 11, there is illustrated a simplified diagram of the overall system for performing the scanning operation for scanning characters. The backpropagation neural network 30, as described above, is comprised of a hidden layer, an output layer 34 and an input layer 50. The output layer 34 is operable to output three output vectors, the output vector 36, the output vector 38 and the output vector 40. These are input to a processor 68, the processor operable to generate scanning control signals on a bus 70 to a scanning control mechanism 72. The processor 68 is also operable to generate an output 70 that represents which character or object is centered in the window. A scanning mechanism 74 is operable to generate the scanning window 32 and scan along an object sequence 78. As described above, the scanning mechanism is operable to normalize the image objects or characters within the scan window 32 prior to performing the overall scanning operation. The scanning mechanism 74 then outputs an input vector 76 to the input layer 50.

The scanning mechanism 74 in the preferred embodiment is a software scanning mechanism that normalizes scanned-in characters and then increments across the scanned-in characters along a single dimension. However, it should be understood that more than one dimension could be utilized in accordance with the present invention. The scanning operation increments, as described above, in steps of three pixels at a time. The width of the window in the preferred embodiment is approximately thirty pixels.

During run time, or tests, there are no labeled characters or character centers. In this case, the system utilizes the network's output values from the output layer 34 to determine what is currently centered under the input window and where to jump to next. Specifically, the input window begins at the left-most position in a field image, and computes an output vector. The system classifies what is currently centered in the input and makes a corrective saccade, to more correctly center the current character. The corrective saccade is made based upon two conditions. If the NOT-CENTERED node in the output vector 36 has a high activation level, this indicates that the window is not between nodes. Also, the previous number of corrective saccades is examined and, if this exceeds three, a decision will be made without further corrective saccades. The system obtains the distance to jump to from the output vector 38 for making the corrective saccade. After the system has classified the current character, then the information in the output vector 40 is utilized to effect a jump to the next adjacent character.

Figure 12:
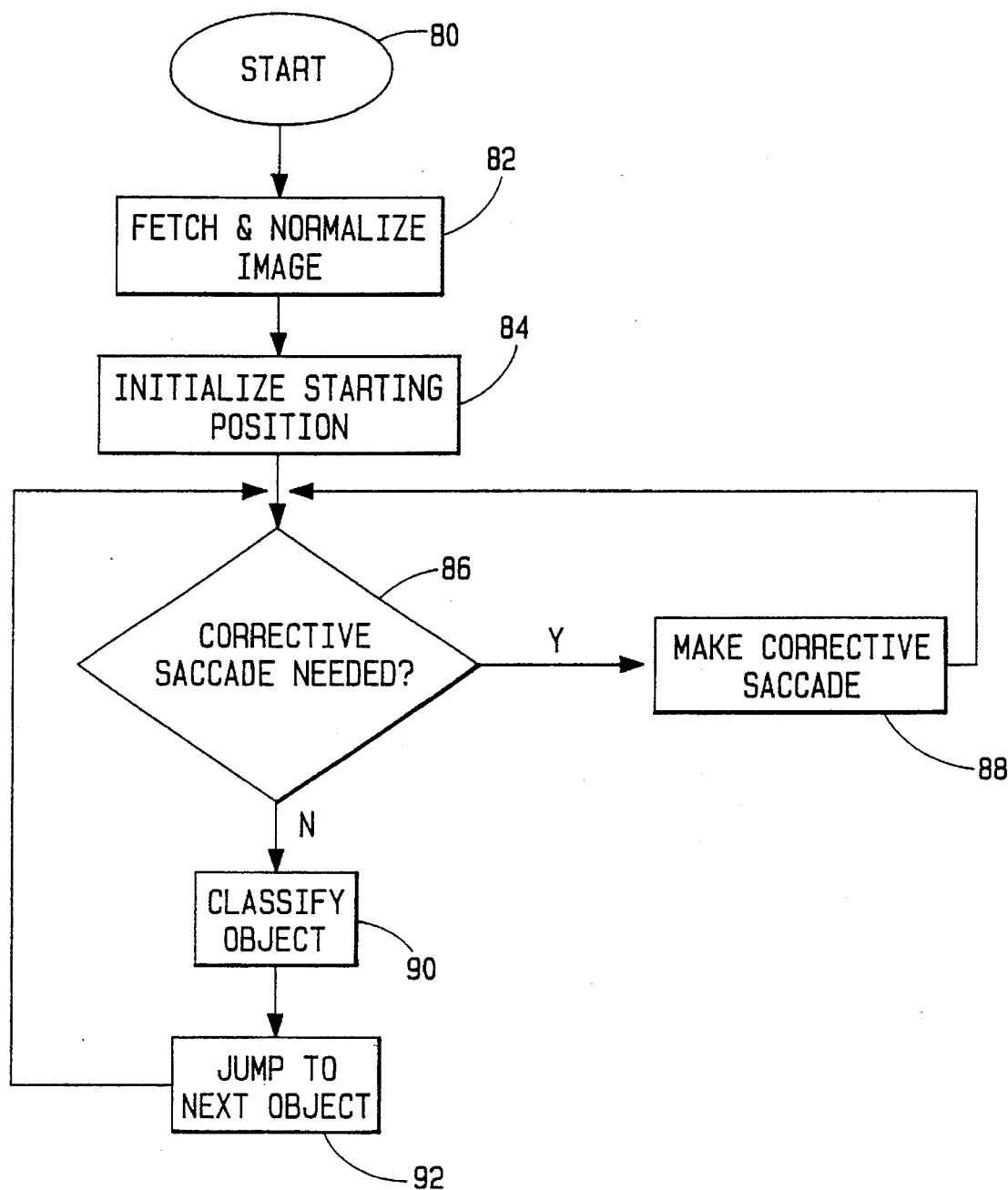
FIG. 12 illustrates a flowchart for the classification operation and corrective saccade.

Referring now to FIG. 12, there is illustrated a flowchart depicting the corrective saccade and classification operation. The flowchart begins at a start block 80 and then proceeds to a function block 82 indicating the step wherein an image is retrieved from the database or scanned from a document, and then normalized to the scanning window. The system then positions the scanning window at the starting point in the image, as indicated by a function block 84. Next, as indicated in block 86, the system determines if a corrective cascade is necessary. This is decided by determining if an object is centered in the scanning window. If no object is centered in the window, a corrective cascade is required, and the system flows along the "Y" path to a function block 88 to execute the corrective saccade. The distance to jump is read from the output nodes that correspond to the distance from the present character to the center of the scan window. The program then flows back in the input of decision block 86. This continues until it is determined that a corrective saccade is no longer necessary. The system then flows along an "N" path from the decision block 86 to the input of a function block 90 to classify the output. After classification, the program then flows to the input of the function block 92 to jump to the next character.

The operation of FIG. 12 is illustrated in the program printout attached hereto as Appendix A and labeled COISR-SACCADE-II.h and II.c, and the main operating program is labeled CAEYE.c and .h.

In summary, there has been provided a pattern recognition scheme utilizing a neural network. The scheme provides for training the neural network on characters that are centered within the input space of the neural network. The activation energy of an output node associated with this input space and the representation of that associated centered character or object exists only when the character is centered within the input space. A plurality of representations are stored within the network in hidden nodes and associated with different output nodes such that when any object is centered within the input space, its associated output node is activated. Representations of two adjacent characters on either side of the center of the input spaces also stored in the hidden nodes. By scanning the input space across the pattern of characters, the respective output node is activated when the character is centered within the window. In addition, information is stored in the hidden nodes representing the distance from the current character to the next character, the input window effectively covering adjacent characters. This information is output in a separate output vector which can be utilized by a scanning control mechanism to allow the system to jump to the next character rather than continue scanning linearly over the characters in the single dimension. Additional information in the form of the distance to the center of the current character is provided as a separate output vector, which information indicates that the character is not exactly centered and that the scanning mechanism is to correct the position of the window to the center of the character. The information provided by the distance to the next character output vector allows the system to make a single jump to the next character and then make a decision. This decision can be delayed until a corrective positioning is made to position the window directly over the character, and then a decision made.

Although the preferred embodiment has been described in detail, it should be understood that various changes, substitutions and alterations can be made therein without departing from the spirit and scope of the invention as defined by the appended claims.

caeye.c

```
/*
**  ------------------------------------------------------------------------
**
**                  ACA Confidential and Proprietary
**
**  Copyright (c) 1990 Microelectronics and Computer Technology Corporation
**
**  All Rights Reserved. Shareholders of MCC may reproduce and distribute
**  these materials for internal purposes by retaining MCC's copyright notice,
**  proprietary legends, and markings on all complete and partial copies.
**
**
**  ------------------------------------------------------------------------
**  ------------------------------------------------------------------------
*/

/*   $Author: mosfet $  */
/*   $Date: 1991/11/05 22:20:24 $  */
/*   $Source: /u45/mosfet/RCS/caeye.c,v $  */
/*   $Revision: 1.9 $  */
/*   $State: Exp $  */
/*   $Log: caeye.c,v $
 * Revision 1.9  1991/11/05  22:20:24  mosfet
 * *** empty log message ***
 *
 * Revision 1.8  1991/11/05  21:35:46  chapman
 * No change
 *
 * Revision 1.7  1991/11/05  20:46:04  mosfet
 * In process of adding testing capability to coisr-saccade-II.
 *
 * Revision 1.6  1991/10/29  22:01:02  mosfet
 * Change the Stepper to change net position.
 *
 * Revision 1.5  1991/10/28  22:36:23  mosfet
 * Proper mode initialization.
 *
 * Revision 1.4  1991/10/22  15:07:07  mosfet
 * with Image library.
 *
 * Revision 1.3  1991/09/30  16:09:02  mosfet
 * Function MakeXIndex made local. Can read swipping from style file
 * for COISR-SACCADE-2.
 *
 * Revision 1.2  1991/09/27  21:29:21  mosfet
 * Can do COISR, COISR-SACCADE-1, COISR-SACCADE-2 with style
 * specific functions in seperates files. It can also use swipping.
 *
 * Revision 1.1  1991/09/13  19:22:00  nnetadm
 * Initial revision
 *
 */ ifndef lint
static char caeye_c_RCS_Id[] = "$Id: caeye.c,v 1.9 1991/11/05 22:20:24 mosfet Exp mosfet $";
static char caeye_c_RCS_Source[] = "$Source: /u45/mosfet/RCS/caeye.c,v $";
endif include <stdio.h>
include <ctype.h>
include <string.h> ifdef __cplusplus
```

```c
extern "C"
{
#include <byteimage.h>
}
else
#include <byteimage.h>
endif include <ha.h>
include <NN.h>
#include <labelloci.h>
#include <caeye.h>
#include <coisr.h>
#include <coisr-saccade-I.h>
include <coisr-saccade-II.h> ifdef DISPLAY_DEMO
include <shadowtext.h>
endif

/* public functions declaration*/

/*
int InitPatternMaker (char*, char*);
void MakePatterns (NN*);
int NetCheck (NN*);
void CleanUpMaker ();
void PrintNetStat (FILE*);
void SetExtras (float*, char);
char ConvertChar (char);
*/

/* global variables */
FILE* fout = NULL;
int width = 0;
int height = 0;
int xoffset = 0;
float on_value = 1.0;
float off_value = 0.0;
char decode_step = 0;
int nepoch = 1;
char target_and_output = 0;
char flip_image = 0;
float* input_vector = NULL;
float* output_vector = NULL;
char** target_names = NULL;
Netmodes net_mode = pattern_mode;

/* private functions declaration*/ define FLAG_UPPERCASE          0x01
define FLAG_LOWERCASE          0x02
#define FLAG_DIGIT              0x04
#define FLAG_PUNCTUATION        0x08
#define FLAG_NEXT_CHAR_DISTANCE 0x10
#define FLAG_CUR_CHAR_DISTANCE  0x20
#define FLAG_BETWEEN_SYMBOL     0x40
define FLAG_DOLLAR_OR_CENTS    0x80 typedef void (*void_func_i) (int);
typedef int (*int_func_IIB) (int*, int*, Image*);
typedef int (*int_func_ii) (int, int);
typedef int (*int_func_BLL) (Image*, LabelLoci*);
typedef int (*int_func_NNII) (NN*, int*, int*);
``` caeye.c

```c
int_func_BLL ProcessImage;
void_func_i MakeImage;
void_func_i MakeTarget;
int_func_IIB InitPosition;
int_func_ii DecodeOutput;
int_func_NNII Stepper;

void InitTarget ();
void WriteData (LabelLoci*, int);
void WriteLabel (LabelLoci*, int);
void OperateData (NN*, LabelLoci*, char);
int StupidCheck ();
int ReadTargetFile (char*);
void BuildTranslator (char*, int);
void DecodeSpecialChars (char*);
int SetupStyle (FILE*, char*);
void NameTargets ();
void ReadCommentLine (FILE*, int);

/* internal variables */ int specials;                           /* info on special-set */
HeartVector xheart;
float* target_vector = NULL;
char* target_chars = NULL;
int nfields = 2;                        /* 1 + 1 */
int field_step = 0;
int pixel_step = 0;
int field_size = 0;
int extra_nodes = 0;
int* heart_i;
int* heart_x;
int cur_ha_width = 0;
int next_ha_width = 0;
int random_shift = 0;
int labelname_flag;
Image in_image;

static int* translate_4_char;           /* see function BuildTranslator */ static int total_test_pat;
static int total_train_pat;
static int ntest_pat;
static int ntrain_pat;

/*--------------------------------------------------------- PUBLIC FUNCTIONS ---*/ int InitPatternMaker (char* outfile, char* stylefile)
{
  extern char* calloc (int, int);

if (!outfile)
    fout = stdout;
  else if ((fout = fopen (outfile, "w")) == NULL)
    {
      fprintf (stderr, "ERROR: can't open %s\n", outfile);
      return (0);
    }
  if (!ReadTargetFile (stylefile)) return (0);

/* image related initialization */
  in_image.height = height;
  in_image.width = 0;
```

```c
      in_image.pixels.c = NULL;
      input_vector = (float*) calloc (width * height, sizeof (float));
      heart_i = (int*) calloc (nfields, sizeof (int));
      heart_x = (int*) calloc (nfields, sizeof (int));

/* target related initialization */
      field_size = strlen (target_chars);
      if (specials & FLAG_BETWEEN_SYMBOL) extra_nodes++;
      if (specials & FLAG_UPPERCASE) extra_nodes++;
      if (specials & FLAG_LOWERCASE) extra_nodes++;
      if (specials & FLAG_DIGIT) extra_nodes++;
      if (specials & FLAG_PUNCTUATION) extra_nodes++;
      field_size += extra_nodes;
      if (specials & FLAG_NEXT_CHAR_DISTANCE) field_size += next_ha_width;
      if (specials & FLAG_CUR_CHAR_DISTANCE) field_size += cur_ha_width;
      target_vector = (float*) calloc (field_size * (nfields-1), sizeof (float));
      output_vector = (float*) calloc (field_size * (nfields-1), sizeof (float));
      NameTargets ();
      /* initialization related to the net */
      if (!StupidCheck ()) return (0);
      ntest_pat = 0;
      ntrain_pat = 0;
      total_test_pat = 0;
      total_train_pat = 0;
      return (1);
} void CleanUpMaker ()
{
   if (fout || fout != stdout) fclose (fout);
} int NetCheck (NN* net)
{
   if (net)
      {
         if (net->n_inputs != width * height)
            {
               fprintf (stderr, "net input doesn't match image size.\n");
               return (0);
            }
         else if (net->n_outputs != field_size * (nfields-1))
            {
               fprintf (stderr, "net output size doesn't match.\n");
               return (0);
            }
      }
   return (1);
} void PrintNetStat (FILE* fp)
{
  if (net_mode == train_mode)
     fprintf (fp, "    %d/%d (%5.2f%%)                                          ",
              ntrain_pat, total_train_pat,
              100 * ((float)ntrain_pat)/((float)total_train_pat));
  else
     fprintf (fp, "    %d/%d (%5.2f%%)                                          ",
              ntest_pat, total_test_pat,
              100 * ((float)ntest_pat)/((float)total_test_pat));
  ntest_pat = 0;
  ntrain_pat = 0;
  total_test_pat = 0;
  total_train_pat = 0;
``` caeye.c

```c
} void MakePatterns (LabelLoci* ll, NN* net)
{
  static int net_position;           /* distance covered by net */
  static int real_position;          /* distance net should jump */
  static int stepper_status;
  char c;

#if DISPLAY_DEMO
  /* works with c++ version of text for display stuff */
  extern int opstatus;
  if (opstatus > 0)                  /* starting */
    {
      in_image.width = 0;
      in_image.height = (dc_mode) ? height-1 : height;
      if (!(*ProcessImage) (&in_image, ll)) return;
      MakeScaledHearts (&xheart, &in_image, ll);
      (*InitPosition) (&real_position, &net_position, &in_image);

opstatus = -1;
      ShowByteImage (&in_image);
      ShowImageChar (0, 0);          /* initialize char display */
      if (net)
        ShowOutputVector ((net_mode != train_mode || decode_step) ?
          net_position : real_position, in_image.width);
    }
  if (stepper_status < 0)
    MarkImageView (0, 0);            /* unmark */
#else
  /* without window stuff the routine is entered once per image */
  in_image.width = 0;
  in_image.height = (dc_mode) ? height-1 : height;
  if (!(*ProcessImage) (&in_image, ll)) return;
  MakeScaledHearts (&xheart, &in_image, ll);
  (*InitPosition) (&real_position, &net_position, &in_image);
#endif
  labelname_flag = 0;
  do                                 /* generating scanned pattern */
    {
      InitTarget ();
      c = ConvertChar (CharacterHeartChar (&xheart, heart_i[0]));
      (*MakeImage) ((net && (net_mode != train_mode || decode_step)) ?
                net_position : real_position);
      (*MakeTarget) (real_position);
      if (net) OperateData (net, ll, c);
      stepper_status = (*Stepper) (net, &real_position, &net_position);
      if (!net) WriteData (ll, stepper_status);

#if DISPLAY_DEMO
      if (stepper_status != 0) CheckOpStatus ();
#endif

}
  while (stepper_status);

#if DISPLAY_DEMO
  stepper_status = 0;
  opstatus = 0;
  MarkImageView (0, 0);              /* unmark */
#endif
}
```

```
/*------------------------------------------------------------- PRIVATE FUNCTIONS ---*/ void InitTarget ()
{
  int j, k;
  int n = 0;
  float* t = target_vector;

if (specials & FLAG_NEXT_CHAR_DISTANCE) n += next_ha_width;
  if (specials & FLAG_CUR_CHAR_DISTANCE) n += cur_ha_width;
  for (j = nfields; --j;)
    {
      for (k = field_size - n; k--; t++) *t = off_value;
      /* don't need to initialize distance encoding part. */
    }
} void SetExtras (float* t, char c)
{
  if (specials & FLAG_UPPERCASE)
    {
      if (isupper (c)) *t = on_value;
      t++;
    }
  if (specials & FLAG_LOWERCASE)
    {
      if (islower (c)) *t = on_value;
      t++;
    }
  if (specials & FLAG_DIGIT)
    {
      if (isdigit (c)) *t = on_value;
      t++;
    }
  if (specials & FLAG_PUNCTUATION)
    {
      if (ispunct (c) || c == ' ') *t = on_value;
      t++;
    }
} char ConvertChar (char c)
{
  int i, j;
  int active;
  int n = strlen (target_chars);

/*
   * characters are converted to the corresponding character of the
   * basic-set according to translation-set
   *
   */
  for (i = 0; i < 4; i++)
    {
      active = 0;
      for (j = 0; j < n; j++)
        {
          if (c == (char)(translate_4_char[j] >> (i * 8) & 0xff))
            return (*(target_chars + j));
          if (translate_4_char[j] >> (i * 8) & 0xff) active = 1;
        }
      if (!active) break;
    }
  return (c);
``` caeye.c

```c
} extern int FindHighestOutput (float*, int);

void OperateData (NN* net, LabelLoci* ll, char real_char)
{
  int cindex;

if (net_mode == train_mode)
    {
      total_train_pat++;
      NNtrain (net, input_vector, target_vector, output_vector);
    }
  else
    {
      total_test_pat++;
      NNrecognize (net, input_vector, output_vector);
    }
  if (target_and_output)
    {
      (*DecodeOutput) ((int)ll->label, 0);
    }
  else if (specials & FLAG_BETWEEN_SYMBOL)
    [
      cindex = FindHighestOutput (output_vector, strlen (target_chars) + 1);
      if (cindex == FindHighestOutput
          (target_vector, strlen (target_chars) + 1))
        (net_mode == train_mode) ? ntrain_pat++ : ntest_pat++;
      (*DecodeOutput) (cindex, 1);
    ]
  else
    {
      cindex = FindHighestOutput (output_vector, strlen (target_chars));
      if (real_char == target_chars[cindex])
        (net_mode == train_mode) ? ntrain_pat++ : ntest_pat++;
      (*DecodeOutput)(cindex, 0);
    }
} void WriteLabel (LabelLoci* ll, int not_end)
{
  int j;
  int sl;
  int cindex;
  char* iname;

if (!labelname_flag & not_end)
    {
      fprintf (fout, (pixel_step >= 0) ? "\n First|" : "\n Last|");
      labelname_flag = 1;
    }
  else if (labelname_flag & !not_end)
    fprintf (fout, (pixel_step >= 0) ? "\n Last|" : "\n First|");
  else
    fprintf (fout, "\n Middle|");
  /* 1 is added for including between_symbol node */
  cindex = FindHighestOutput (target_vector, strlen (target_chars) + 1);
  if (cindex < strlen (target_chars))
    fprintf (fout, "%c|from|", (target_chars [cindex] == ' ') ?
             '_' : target_chars [cindex]);
  else
    fprintf (fout, "between_symbol|from|");

iname = ll->label;
```

```c
      if (iname)
        {
          /* spaces are replaced with '_' */
          sl = strlen (iname);
          for (j = 0; sl--; j++)
            fprintf (fout, "%c", (iname[j] == ' ') ? '_' : iname[j]);
        }
      fprintf (fout, "\n");
    } void WriteData (LabelLoci* ll, int end_loop)
{
  int i, j;
  float* f;

/* in Rumelhart-McClelland pattern file format */
  WriteLabel (ll, end_loop);
  for (i = height-1; i >= 0; i--)
    {
      for (j = 0; j < width; j++)
        {
          fprintf (fout, " %4.2f", input_vector[i*width + j]);
        }
      fprintf (fout, "\n");
    }
  fprintf (fout, "\n");
  f = target_vector;
  for (j = field_size * (nfields-1); j--; f++)
    {
      fprintf (fout, " %4.2f", *f);
    }
  fprintf (fout, "\n");
} int StupidCheck ()
{
  if (on_value <= off_value)
    {
      fprintf (stderr, "on_value is greater or equal to off_value.\n");
      return (0);
    }
  else if (width < 0 || height < 0)
    {
      fprintf (stderr, "width or height is less than zero.\n");
      return (0);
    }
  else if (nfields <= 0 || (field_step == 0 && pixel_step == 0))
    {
      fprintf (stderr, "# of target fields or fields to step cannot be less than or equal
 to zero.\n");
      return (0);
    }
  else if (xoffset > (width-1))
    {
      fprintf (stderr, "right is larger than image width.\n");
      return (0);
    }
  else
    {
      return (1);
    }
} char* format_name;
``` caeye.c

```c
int ReadTargetFile (char* stylefile)
{
  /*
   * Reads FORMAT-1.
   *
   ****************************************************************
   * FORMAT-1
   * basic-set       <the character set ('_' specify 'space'>
   * translation-set <character same as one of basic-set in same column>
   *       .
   *       .
   *       .
   *    (max 4 sets)
   * special-set     <number-of-keywords> <<keyword> [number] ... >
   * style           <style-name> [style-parameters ... ]
   *
   ****************************************************************
   * Currently recognized keywords are:
   *    uppercase, lowercase, digit, punctuation,
   *    encode-next-char-distance, encode-current-char-distance,
   *    between-symbol-node.
   * basic-set and style are required. the comments below in the code
   * provide further details.
   *
   * styles are:
   *  - COISR-SACCADE-1 or JUMPING-JUMPING (old name)
   *         [no of fields (default = 1) [no of fields to step (no default)]]
   *  - COISR-SACCADE-2 or JUMPING-INCREMENTAL (old name)
   *         [no pixels to step (no default)]
   *  - DRC
   *         [no pixels to step (default = 3, <0 indicates scan left)
   *         [dollars_cents mode (default = 0, No, >0 indicates Yes)
   *         [remove entry box (default = 0, No, >0 indicates Yes)
   *         [remove space around chars (default = 0, No, >0 indicates Yes)
   *         [no pixels left as horizontal borders in image processing
   *         [no pixels left as vertical borders in image processing
   *         [remove blank rows (default = 0, No, >0 indicates Yes)
   *         [remove blank columns (default = 0, No, >0 indicates Yes)
   *             ]]]]]]]]
   *
   */ int i, n;
  int nt = 0;
  char cbuf[128];
  FILE* fstyle;
  extern char* strdup (char*);

if ((fstyle = fopen (stylefile, "r")) == NULL)
    {
      fprintf (stderr, "ERROR: can't open %s\n", stylefile);
      return (0);
    }
  fscanf (fstyle, "%s", cbuf);
  if (strcmp (cbuf, "FORMAT-1") &&
      strcmp (cbuf, "FORMAT-2"))
    {
      fprintf (stderr, "ERROR: unknown format");
      return (0);
    }
  format_name = strdup (cbuf);
  while (fscanf (fstyle, "%s", cbuf) != EOF)
    {
```

```c
if (!strcmp (cbuf, "basic-set"))
  {
    if (fscanf (fstyle, "%s", cbuf) > 0)
      {
        target_chars = strdup (cbuf);
        for (i = strlen (target_chars) - 1; i >= 0; i--)
          if (target_chars [i] == '_')
            target_chars [i] = ' ';
        translate_4_char =
          (int*) calloc (strlen (target_chars), sizeof (int));
      }
    else
      {
        fprintf (stderr, "ERROR: basic-set problem in %s\n",
                 stylefile);
        return (0);
      }
  }
else if (!strcmp (cbuf, "translation-set"))
  {
    if (target_chars && fscanf (fstyle, "%s", cbuf) > 0)
      {
        if (nt >= 4)
          {
            fprintf (stderr, "SORRY: can't do more translation\n");
            return (0);
          }
        if (strlen (target_chars) != strlen (cbuf))
          {
            fprintf (stderr, "ERROR: translation-set problem in %s\n",
                     stylefile);
            return (0);
          }
        BuildTranslator (cbuf, nt++);
      }
  }
else if (!strcmp (cbuf, "special-set"))
  {
    fscanf (fstyle, "%d", &n);
    for (i = 0; i < n; i++)
      {
        if (fscanf (fstyle, "%s", cbuf) > 0)
          DecodeSpecialChars (cbuf);
        else
          {
            fprintf (stderr, "ERROR: special-set problem in %s\n",
                     stylefile);
            return (0);
          }
      }
  }
else if (!strcmp (cbuf, "style"))
  {
    if (fscanf (fstyle, "%s", cbuf) > 0)
      {
        if (!SetupStyle (fstyle, cbuf)) return (0);
      }
    else
      {
        fprintf (stderr, "ERROR: style problem in %s\n",
                 stylefile);
        return (0);
      }
  }
``` caeye.c

```c
      else if (cbuf[0] - '#')
        {
          ReadCommentLine (fstyle, 1);
        }
    }
  fclose (fstyle);
  return (1);
} void BuildTranslator (char* cbuf, int level)
{
  /*
   * each byte of translate_4_char may contain a character which
   * is translated to the corresponding character in target_chars.
   * Since translate_4_char holds 4 characters the limit is 4.
   * The dummy character is the unused '|'.
   *
   */ int i, n;
  for (i = 0, n = strlen (cbuf); i < n; i++)
    {
      if (*cbuf != '|')
        translate_4_char[i] |= *cbuf << (level * 8);
      cbuf++;
    }
} void DecodeSpecialChars (char* cbuf)
{
  if (!strcmp (cbuf, "uppercase"))
    specials |= FLAG_UPPERCASE;
  else if (!strcmp (cbuf, "lowercase"))
    specials |= FLAG_LOWERCASE;
  else if (!strcmp (cbuf, "digit"))
    specials |= FLAG_DIGIT;
  else if (!strcmp (cbuf, "punctuation"))
    specials |= FLAG_PUNCTUATION;
  else if (!strcmp (cbuf, "encode-next-char-distance"))
    specials |= FLAG_NEXT_CHAR_DISTANCE;
  else if (!strcmp (cbuf, "encode-current-char-distance"))
    specials |= FLAG_CUR_CHAR_DISTANCE;
  else if (!strcmp (cbuf, "between-symbol"))
    specials |= FLAG_BETWEEN_SYMBOL;
  else
    fprintf (stderr, "WARNING: ignoring unrecognized special keyword\n");
} int NothingFunc (int useless1, int useless2)
{
} int SetupStyle (FILE* fstyle, char* cbuf)
{
  if (!strcmp (cbuf, "JUMPING-JUMPING") ||  /* old name */
      !strcmp (cbuf, "COISR-SACCADE-1"))
    {
      ProcessImage = ProcessImageCoisr;
      InitPosition = InitPositionCoisrSaccade1;
      MakeImage = MakeImageCoisrSaccade;
      MakeTarget = MakeTargetCoisrSaccade1;
      Stepper = StepperCoisrSaccade1;
      DecodeOutput = DecodeDistanceCoisrSaccade1;
      next_ha_width = width/5 + 3;
```

```c
      fscanf (fstyle, "%d%d%d", &nfields, &field_step, &random_shift);
    }
  else if (!strcmp (cbuf, "INCREMENTAL-JUMPING") ||  /* old name */
           !strcmp (cbuf, "COISR-SACCADE-2"))
    {
      ProcessImage = ProcessImageCoisr;
      InitPosition = InitPositionCoisrSaccade2;
      MakeImage = MakeImageCoisrSaccade;
      MakeTarget = MakeTargetCoisrSaccade2;
      Stepper = StepperCoisrSaccade2;
      if (net_mode == train_mode)
        DecodeOutput = (target_and_output) ?
          JustTargetandOutput : DecodeDistanceCoisrSaccade2;
      else
        DecodeOutput = NothingFunc;
      next_ha_width = width/5 + 3;
      cur_ha_width = width/5 + 3;
      if (!strcmp (format_name, "FORMAT-1"))
        {
          fscanf (fstyle, "%d", &pixel_step);
          ReadCommentLine (fstyle, 0);
          fscanf (fstyle, "%d%d%d%d%d%d%d",
                  &dc_mode,
                  &remove_box, &remove_space,
                  &h_border, &v_border,
                  &remove_blank_rows, &remove_blank_columns);
        }
      else if (!strcmp (format_name, "FORMAT-2"))
        {
          fscanf (fstyle, "%d", &pixel_step);
          ReadCommentLine (fstyle, 0);
          fscanf (fstyle, "%d%f%f%d",
                  &multi_recog_threshold,
                  &between_symbol_threshold,
                  &highest_value_threshold,
                  &max_n_iterations);
          ReadCommentLine (fstyle, 0);
          fscanf (fstyle, "%d%d%d%d%d%d%d",
                  &dc_mode,
                  &remove_box, &remove_space,
                  &h_border, &v_border,
                  &remove_blank_rows, &remove_blank_columns);
        }
    }
  else if (!strcmp (cbuf, "COISR"))
    { InitPosition = InitPositionCoisr;
      ProcessImage = ProcessImageCoisr;
      MakeImage = MakeImageCoisr;
      Stepper = StepperCoisr;
      MakeTarget = MakeTargetCoisr;
      DecodeOutput = DecodeOutputCoisr;
      fscanf (fstyle, "%d", &pixel_step);
      fscanf (fstyle, "%d%d%d%d%d%d%d", &dc_mode,
              &remove_box, &remove_space,
              &h_border, &v_border,
              &remove_blank_rows, &remove_blank_columns);
    }
  else
    {
      fprintf (stderr, "ERROR: unknown style\n");
      return (0);
    }
  return (1);
}
``` caeye.c

```c
void NameTargets ()
{
  int i, j;
  char ts[32];
  int sl = strlen (target_chars);
  char** n;
  extern char* strdup (char*);

target_names = (char**) calloc (field_size * (nfields-1), sizeof (char*));
  n = target_names;
  for (i = 0; i < sl; i++, n++)
    {
      *n = (char*) calloc (10, sizeof (char));
      for (j = 0; j < 8; j++) (*n)[j] = ' ';
      (*n)[8] = target_chars[i];
    }
  if (specials & FLAG_BETWEEN_SYMBOL)
    *(n++) = strdup ("  bet_sym");
  if (specials & FLAG_UPPERCASE)
    *(n++) = strdup ("    ucase");
  if (specials & FLAG_LOWERCASE)
    *(n++) = strdup ("    dcase");
  if (specials & FLAG_DIGIT)
    *(n++) = strdup ("    digit");
  if (specials & FLAG_PUNCTUATION)
    *(n++) = strdup ("    punct");
  if (specials & FLAG_NEXT_CHAR_DISTANCE)
    {
      for (i = 0; i < next_ha_width; i++, n++)
        {
          sprintf (ts, " next-%2d", i);
          *n = strdup (ts);
        }
    }
  if (specials & FLAG_CUR_CHAR_DISTANCE)
    {
      for (i = 0; i < cur_ha_width; i++, n++)
        {
          sprintf (ts, "prev-%d", i);
          *n = strdup (ts);
        }
    }
} void ReadCommentLine (FILE* fin, int flag_comment_char_read)
{
  char c;

if (!flag_comment_char_read)
    {
      c = getc (fin);
      while (c != '#' && c != EOF)
        {
          c = getc (fin);
          if (c >= '0')
            {
              ungetc (c, fin);
              return;
            }
        }
    }
  while (c != '\n' && c != EOF)
    c = getc (fin);
``` caeye.h

```c
/*
** ------------------------------------------------------------------
**
**                  ACA Confidential and Proprietary
**
** Copyright (c) 1990 Microelectronics and Computer Technology Corporation
**
** All Rights Reserved. Shareholders of MCC may reproduce and distribute
** these materials for internal purposes by retaining MCC's copyright notice,
** proprietary legends, and markings on all complete and partial copies.
**
**
** ------------------------------------------------------------------
** ------------------------------------------------------------------
*/

/* $Author: mosfet $ */
/* $Date: 1991/10/29 22:02:17 $ */
/* $Source: /u45/mosfet/RCS/caeye.h,v $ */
/* $Revision: 1.5 $ */
/* $State: Exp $ */
/* $Log: caeye.h,v $
 * Revision 1.5  1991/10/29  22:02:17  mosfet
 * *** empty log message ***
 *
 * Revision 1.4  1991/10/22  15:09:13  mosfet
 * with Image library.
 *
 * Revision 1.3  1991/10/21  15:48:43  mosfet
 * using Image.
 *
 * Revision 1.2  1991/09/27  21:30:09  mosfet
 * Works with seperated COISR, COISR-SACCADE-1, and COISR-SACCADE-2.
 *
 * Revision 1.1  1991/09/13  19:23:07  nnetadm
 * Initial revision
 *
 */ ifndef lint
static char caeye_h_RCS_Id[] = "$Id: caeye.h,v 1.5 1991/10/29 22:02:17 mosfet Exp $";
static char caeye_h_RCS_Source[] = "$Source: /u45/mosfet/RCS/caeye.h,v $";
endif ifndef _caeye_h
define _caeye_h define JUMPING_JUMPING        1
define JUMPING_INCREMENTAL    2 typedef enum {run_mode, test_mode, train_mode, pattern_mode} Netmodes;

/* public functions declaration*/ ifdef __cplusplus extern "C" int InitPatternMaker (char*, char*);
extern "C" void MakePatterns (LabelLoci*, NN*);
extern "C" int NetCheck (NN*);
extern "C" void CleanUpMaker ();
extern "C" void PrintNetStat (FILE*);
extern "C" void SetExtras (float*, char);
extern "C" char ConvertChar (char);
``` else

```
extern int InitPatternMaker (char*, char*);
extern void MakePatterns (LabelLoci*, NN*);
extern int NetCheck (NN*);
extern void CleanUpMaker ();
extern void PrintNetStat (FILE*);
extern void SetExtras (float*, char);
extern char ConvertChar (char);
``` endif

```
/* global variables */
extern FILE* fout;
extern int width;
extern int height;
extern int xoffset;
extern float on_value;
extern float off_value;
extern char decode_step;
extern int nepoch;
extern char target_and_output;
extern char flip_image;
extern float* output_vector;
extern char** target_names;
extern Netmodes net_mode;

#define FLAG_UPPERCASE          0x01
define FLAG_LOWERCASE          0x02
#define FLAG_DIGIT              0x04
#define FLAG_PUNCTUATION        0x08
#define FLAG_NEXT_CHAR_DISTANCE 0x10
#define FLAG_CUR_CHAR_DISTANCE  0x20
#define FLAG_BETWEEN_SYMBOL     0x40
define FLAG_DOLLAR_OR_CENTS    0x80 extern int nfields;
extern float* target_vector;
extern float* input_vector;
extern char* target_chars;
extern HeartVector xheart;
extern int* heart_i;
extern int* heart_x;
extern int field_step;
extern int pixel_step;
extern int field_size;
extern int extra_nodes;
extern int next_ha_width;
extern int cur_ha_width;
extern int specials;             /* info on special-set */
extern Image in_image;
extern int random_shift;
extern int labelname_flag;
``` endif coisr-saccade-II.c

```
/*
**  ------------------------------------------------------------------------
**
**                    ACA Confidential and Proprietary
**
**  Copyright (c) 1990 Microelectronics and Computer Technology Corporation
**
**  All Rights Reserved. Shareholders of MCC may reproduce and distribute
**  these materials for internal purposes by retaining MCC's copyright notice,
**  proprietary legends, and markings on all complete and partial copies.
**
**
**  ------------------------------------------------------------------------
**  ------------------------------------------------------------------------
*/

/* $Author: mosfet $ */
/* $Date: 1991/11/05 20:45:14 $ */
/* $Source: /u45/mosfet/RCS/coisr-saccade-II.c,v $ */
/* $Revision: 1.7 $ */
/* $State: Exp $ */
/* $Log: coisr-saccade-II.c,v $
 * Revision 1.7  1991/11/05  20:45:14  mosfet
 * In process of adding testing capability.
 *
 * Revision 1.6  1991/10/29  22:00:16  mosfet
 * Change the Stepper to change net position.
 *
 * Revision 1.5  1991/10/22  15:08:28  mosfet
 * with Image library.
 *
 * Revision 1.4  1991/10/01  22:07:56  mosfet
 * small fix in encoding for xoffset.
 *
 * Revision 1.3  1991/10/01  15:39:31  mosfet
 * offset bug fixed.
 *
 * Revision 1.2  1991/09/30  16:07:05  mosfet
 * Function MakeXIndex made local.
 *
 * Revision 1.1  1991/09/27  21:33:12  mosfet
 * Initial revision
 *
 */ ifndef lint
static char coisr_saccade_II_c_RCS_Id[] = "$Id: coisr-saccade-II.c,v 1.7 1991/11/05 20:
45:14 mosfet Exp mosfet $";
static char coisr_saccade_II_c_RCS_Source[] = "$Source: /u45/mosfet/RCS/coisr-saccade-I
I.c,v $";
endif include <stdio.h>
include <ctype.h> ifdef __cplusplus
extern "C"
{
#include <byteimage.h>
}
else
#include <byteimage.h>
endif
```

```c
#include <ha.h>
include <NN.h>
#include <labelloci.h>
#include <caeye.h>
include <coisr-saccade-II.h> ifdef DISPLAY_DEMO
include <shadowtext.h>
endif int multi_recog_threshold = 0;
float between_symbol_threshold = 0.4;
float highest_value_threshold = 0.4;
int max_n_iterations = 3;

static int Heart2Heart_right (int);
static void SetIncTarget_right (float*, char, int);
static int DistanceEncode_right (float*, int);
static void MakeXIndex_2 ();
static void RejectChar (int, float);
static void AcceptChar (int, float);
static void RuntimeStep (int*);
extern int FindHighestOutput (float*, int);

#ifdef __cplusplus
   extern "C" int strlen (char*);
   extern "C" char* strchr (char*, char);
   extern "C" int exit (int);
endif /*-------------------------------------------------------- PUBLIC FUNCTIONS ---*/ int InitPositionCoisrSaccade2 (int* rpos, int* npos, Image* image)
{
  if (pixel_step >= 0)
     {
        heart_i[0] = 0;
        *rpos = *npos = 0;
     }
  else
     {
        heart_i[0] = xheart.len - 1;
        *rpos = *npos = image->width - 1;
     }
  heart_x[0] = CharacterHeart_X (&xheart, heart_i[0]);
  MakeXIndex_2 ();
} void MakeTargetCoisrSaccade2 (int position)
{
  char c;

c = ConvertChar (CharacterHeartChar (&xheart, heart_i[0]));
  /* from left to right is not yet implemented */
  SetIncTarget_right (target_vector, c, position);
  SetExtras (target_vector + strlen (target_chars), c);
  DistanceEncode_right (target_vector + strlen (target_chars) + extra_nodes,
                        position);
} int StepperCoisrSaccade2 (NN* net, int* rpos, int* npos)
{
  int edge;
``` coisr-saccade-II.c

```c
   if (pixel_step > 0)
     {
        if (net && (net_mode != train_mode || decode_step))
          {
             RuntimeStep (npos);
             return (*npos <= in_image.width);
          }
        else
          {
             *rpos += pixel_step;
             if (heart_x[1] < 0)
               {
                  /* end of the scan */
                  edge = (width > in_image.width) ? width : in_image.width;
                  if (*rpos >= edge)
                     heart_x[0] = heart_x[1];
               }
             /* make the next character current after crossing the mid point */
             else if (*rpos > ((heart_x[0] + heart_x[1]) / 2))
               {
                  heart_x[0] = CharacterHeartRightAt_X (&xheart, *rpos);
                  heart_i[0] = CharacterHeartRightAt (&xheart, heart_x[0]);
               }
             MakeXIndex_2 ();
             return (heart_x[0] >= 0);
          }
     }
   else if (pixel_step < 0)
     {
        fprintf (stderr, "\nNo right scanning available\n");
        exit (1);
     }
   else
     {
        return (0);
     }
} void RuntimeStep (int* npos)
{
   int index;                            /* highest index */
   int local_step;                       /* current character distance */
   float step;                           /* next character distance */
   float flocal_step;                    /* current character distance */
   static int n_iter = 0;                /* number of local corrections */
   static int rel_prev_position = 0;     /* loop breaking param */ step = HAdecode (output_vector + field_size - cur_ha_width -
                    next_ha_width, -5.0, 5.0, next_ha_width);
   flocal_step = HAdecode (output_vector + field_size - cur_ha_width,
                    -5.0 - width/2, 5.0, cur_ha_width);
   index = FindHighestOutput (output_vector, strlen (target_chars));
   local_step = (flocal_step >= 0) ?
      (int) (flocal_step + 0.5) : - ((int)(-(flocal_step + 0.5)));
   if (output_vector [strlen (target_chars)] > between_symbol_threshold)
     {                                   /* local saccade */
        if (!local_step || ++n_iter >= max_n_iterations)
          {
             RejectChar (index, flocal_step);
             n_iter = 0;
             rel_prev_position = (int)(step + 0.5);
             *npos += rel_prev_position;
#if DISPLAY_DEMO
```

```
                ShowOutputVector (*npos, 0);
#endif
          }
       rel_prev_position += local_step;
       if (rel_prev_position <= 0)
            {
              n_iter = 0;
              fprintf (fout, "Loop detected!!! Aborting the image.\n");
              rel_prev_position = in_image.width;
              *npos += rel_prev_position;
#if DISPLAY_DEMO
              ShowOutputVector (*npos, 0);
#endif
            }
       else *npos += local_step;
     }
   else
       {                                        /* recognition */
         if (rel_prev_position <= multi_recog_threshold)
            {
              n_iter = 0;
              fprintf (fout, "Recognizing the same character again!!!\n");
              rel_prev_position = (int)(step + 0.5) + 2;
#if DISPLAY_DEMO
              ShowOutputVector (*npos, 0);
#endif
              *npos += rel_prev_position;
            }
         AcceptChar (index, flocal_step);
         n_iter = 0;
         rel_prev_position = (int)(step + 0.5);
         *npos += rel_prev_position;
#if DISPLAY_DEMO
         ShowImageChar (target_chars[index], 0); /* useless second arg */
         ShowOutputVector (*npos, 0);
#endif
       }
} void RejectChar (int index, float local_step)
{
  float highest;
  float next_highest;

highest = output_vector [index];
  output_vector [index] = 0;
  next_highest = output_vector
     [FindHighestOutput (output_vector, strlen (target_chars))];
  output_vector [index] = highest;
  fprintf (fout, "<rejected>, (current_jump %f), max - bs = %f, max - max2 = %f\n",
           local_step,
           highest - output_vector [strlen (target_chars)],
           highest - next_highest);
} void AcceptChar (int index, float local_step)
{
  float highest;
  float next_highest;

highest = output_vector [index];
  output_vector [index] = 0;
  next_highest = output_vector
     [FindHighestOutput (output_vector, strlen (target_chars))];
``` coisr-saccade-II.c

```c
    output_vector [index] = highest;
    fprintf (fout, "'%c', (current_jump %f), max = %f, max = max2 = %f\n",
             target_chars [index], local_step,
             highest - output_vector [strlen (target_chars)],
             highest - next_highest);

} int JustTargetandOutput (int label, int useless2)
{
  int i;
  int step;
  float* f;

fprintf (fout, (!labelname_flag) ? "\n F-" : "\n N-");
  if (!labelname_flag) labelname_flag = 1;
  fprintf (fout, "%s ", (char*)label);
  for (i = field_size, f = target_vector; i--; f++)
    fprintf (fout, " %4.2f", *f);
  fprintf (fout, "\t");
  for (i = field_size, f = output_vector; i--; f++)
    fprintf (fout, " %4.2f", *f);
  fprintf (fout, "\n");
} int DecodeDistanceCoisrSaccade2 (int index, int bsflag)
{
} void insideDecodeDistance (int index, int bsflag)
{
  float highest;
  float next_highest;
  int tc_len;
  int step;
  int cur_dist;
  int real_step;
  int real_index;
  int real_cur_dist;

step = (int)
    HAdecode (output_vector + field_size - cur_ha_width - next_ha_width,
              -5.0, 5.0, next_ha_width);
  real_step = (int)
    HAdecode (target_vector + field_size - cur_ha_width - next_ha_width,
              -5.0, 5.0, next_ha_width);
  cur_dist = (int)
    HAdecode (output_vector + field_size - cur_ha_width,
              -5.0 - width/2, 5.0, cur_ha_width);
  real_cur_dist = (int)
    HAdecode (target_vector + field_size - cur_ha_width,
              -5.0 - width/2, 5.0, cur_ha_width);

tc_len = strlen (target_chars) + ((bsflag) ? 1 : 0);
  highest = output_vector[index];
  real_index = FindHighestOutput (target_vector, tc_len);
  output_vector[index] = 0.0;
  next_highest = output_vector [FindHighestOutput (output_vector, tc_len)];
  output_vector[index] = highest;

if (bsflag)
    {
       if (index == tc_len - 1)
          fprintf (fout, "<%s> ", "BS");
```

```
        else
            fprintf (fout, "'%c' ", target_chars [index]);
        if (real_index == tc_len - 1)
            fprintf (fout, "(<%s>) ", "BS");
        else
            fprintf (fout, "('%c') ", target_chars [real_index]);
    }
    fprintf (fout, "\t[%f], %2d (%2d), %2d (%2d)\n",
            highest - next_highest, step, real_step, cur_dist, real_cur_dist);

#if DISPLAY_DEMO
    ShowImageChar (target_chars[index], (net_mode == train_mode) ?
                real_step : step);
#endif
}

/*---------------------------------------------------------- PRIVATE FUNCTIONS ---*/ int Heart2Heart_right (int position)
{
    static int prev;

if (heart_i[0] == 0 && position < heart_x[0])
        prev = 2 * heart_x[0];
    else if (heart_x[1] >= 0)
        prev = heart_x[1] - heart_x[0];
    else if (position > heart_x[0])
        prev = 2 * (((width > in_image.width) ? in_image.width : width)
                - 1 - heart_x[0]);

return (prev);
} define RELATIVE_FLAT_HALF 0.15 void SetIncTarget_right (float* t, char c, int position)
{

/*
        NOTE: position = real position - x offset

AT THE BEGINNING:            AT THE END:
            -----------------            -----------

2* hh                        2* hh
                |<----->|                    |<----->|
                 ---                          ---
                |       |                    |       |
                |  /                          \      |
                | /                            \     |
                |/                              \    |
                |/                                \  |
                 --                              --
            ->|   |<-                        ->|   |<-

1/2 * flat_half              1/2 * flat_half

IN THE MIDDLE:
                    -------------- heart_x[0]   heart_x[1]

|            |
``` coisr-saccade-II.c

```
            |<---- hh ----->|
         ---                 ---
        /   \               /   \
       /     \             /     \
      /       \           /       \
     /         \         /         \
    /           \       /           \
   ..            ---  ---            ..
   :                  ->|  |<-
   :
   :                  flat_half = hh * 30%
   :
         between_symbol
*/ int hh;
char* pc;
float val;
int flat_half;

hh = Heart2Heart_right (position);
flat_half = (int)((float)hh * RELATIVE_FLAT_HALF);
if (!flat_half) flat_half = 1;
if (position <= (heart_x[0] - (hh >> 1) + flat_half))
   val = off_value;
else if (position <= (heart_x[0] - flat_half))
   val = ((float)(off_value - on_value) /
         (float)((hh >> 1) - 2 * flat_half)) *
            (heart_x[0] - flat_half - position) + on_value;
else if (position <= (heart_x[0] + flat_half))
   val = on_value;
else if (position <= ((hh >> 1) + heart_x[0] - flat_half))
   val = ((float)(off_value - on_value) /
         (float)((hh >> 1) - 2 * flat_half)) *
            (position - heart_x[0] - flat_half) + on_value;
else if (position <= (heart_x[0] + (hh >> 1) + flat_half))
   val = off_value;

if (pc = (char*)strchr (target_chars, c))
   t[pc-target_chars] = val;

/* between-symbol node is right after all character nodes */
if (specials & FLAG_BETWEEN_SYMBOL)
   t[strlen (target_chars)] = on_value - (val - off_value);
} int DistanceEncode_right (float* t, int position)
{
/*
            CHARACTER DISTANCE ENCODING
            --------------------------- current                    next

/\/\/\/\/\/\/\            /\/\/\/\/\/\/\
           / /\/\/\/\/\/\/\ \        / /\/\/\/\/\/\/\ \
           |<------------->|         |<------------>|
           |   width/5+3   |         |   width/10+3 |
           |                         |

-5.0+width/2                -5.0

No hearts in the window:
```

```
                current character distance  = width/2
                next character distance     = width/2

One character in the window:
                current character distance  = (current-char-heart - position)
                next character distance     = width/2 or edge Two characters in the window:
                current character distance  = (current-char-heart - position)
                next character distance     = next-char-heart - current_char_heart
    */ int ccd;
    int ncd;
    int n = 0;

ccd = ((heart_x[0] - position) > width/2) ?
        width/2 : heart_x[0] - position;
    if (heart_x[1] > 0)
       ncd = ((heart_x[1] - position) < width/2)
           ? (heart_x[1] - position) : width/2;
    else
       ncd = width - position;
    if (specials & FLAG_NEXT_CHAR_DISTANCE)
       {
          HAencode (ncd, t, -5.0, 5.0, next_ha_width, triangle, 10.0);
          n += next_ha_width;
       }
    if (specials & FLAG_CUR_CHAR_DISTANCE)
       {
          HAencode (ccd, t+n, -5.0 - width/2, 5.0, cur_ha_width, triangle, 10.0);
          n += cur_ha_width;
       }
    return (n);
} void MakeXIndex_2 ()
{
    int j;
    int sign;
    int reached_end = 0;

for (j = 1; j < nfields; j++)
       {
          if (!reached_end)
             {
                heart_i[j] = (pixel_step >= 0) ?
                   CharacterHeartRight (&xheart, heart_x[j-1]) :
                      CharacterHeartLeft (&xheart, heart_x[j+1]);
                heart_x[j] = CharacterHeart_X (&xheart, heart_i[j]);
                if (heart_x[j] < 0) reached_end = 1;
             }
          else
             heart_x[j] = -1;
       }
}
``` coisr-saccade-II.h

```
/*
**  ------------------------------------------------------------------------
**
**                  ACA Confidential and Proprietary
**
**  Copyright (c) 1990 Microelectronics and Computer Technology Corporation
**
**  All Rights Reserved. Shareholders of MCC may reproduce and distribute
**  these materials for internal purposes by retaining MCC's copyright notice,
**  proprietary legends, and markings on all complete and partial copies.
**
**
**  ------------------------------------------------------------------------
**  ------------------------------------------------------------------------
*/

/* $Author: mosfet $ */
/* $Date: 1991/11/05 20:45:37 $ */
/* $Source: /u45/mosfet/RCS/coisr-saccade-II.h,v $ */
/* $Revision: 1.4 $ */
/* $State: Exp $ */
/* $Log: coisr-saccade-II.h,v $
 * Revision 1.4  1991/11/05  20:45:37  mosfet
 * In process of adding testing capability.
 *
 * Revision 1.3  1991/10/29  22:00:31  mosfet
 * Change the Stepper to change net position.
 *
 * Revision 1.2  1991/10/22  15:09:44  mosfet
 * with Image library.
 *
 * Revision 1.1  1991/09/27  21:33:46  mosfet
 * Initial revision
 *
 */ ifndef lint
static char coisr_saccade_II_h_RCS_Id[] = "$Id: coisr-saccade-II.h,v 1.4 1991/11/05 20:45:37 mosfet Exp $";
static char coisr_saccade_II_h_RCS_Source[] = "$Source: /u45/mosfet/RCS/coisr-saccade-II.h,v $";
endif ifndef _coisr_saccade_II_h_
define _coisr_saccade_II_h_ ifdef __cplusplus extern "C" int InitPositionCoisrSaccade2 (int*, int*, Image*);
extern "C" void MakeTargetCoisrSaccade2 (int);
extern "C" int StepperCoisrSaccade2 (NN*, int*, int*);
extern "C" int JustTargetandOutput (int, int);
extern "C" int DecodeDistanceCoisrSaccade2 (int, int);

else extern int InitPositionCoisrSaccade2 (int*, int*, Image*);
extern void MakeTargetCoisrSaccade2 (int);
extern int StepperCoisrSaccade2 (NN*, int*, int*);
extern int JustTargetandOutput (int, int);
extern int DecodeDistanceCoisrSaccade2 (int, int);

#endif
```

```
extern int multi_recog_threshold;
extern float between_symbol_threshold;
extern float highest_value_threshold;
extern int max_n_iterations;

#endif
``` ha.h

```c
/* -*- C -*- */

/*******************************************************************

ACA Confidential and Proprietary

Copyright (c) 1991 Microelectronics and Computer Technology Corporation

All Rights Reserved. Shareholders of MCC may reproduce and distribute
these materials for internal purposes by retaining MCC's copyright notice,
proprietary legends, and markings on all complete and partial copies.

********************************************************************/

/********************************************************************
James A. Pittman ha.h February, 1991

HyperAcuity

Three functions to encode and decode a quantity into a vector of
activations and back, and to judge the quality of an encoding.

This was written assuming ANSI C.

********************************************************************/

/*   $Author: nnetadm $ */
/*   $Date: 1991/09/13 19:30:25 $ */
/*   $Source: /u1/mosfet/RCS/ha.h,v $ */
/*   $Revision: 1.1 $ */
/*   $State: Exp $ */
/*   $Log: ha.h,v $
 * Revision 1.1  1991/09/13  19:30:25  nnetadm
 * Initial revision
 *
 *
 */ ifndef lint
static char ha_h_RCS_Id[] = "$Id: ha.h,v 1.1 1991/09/13 19:30:25 nnetadm Exp mosfet $";
static char ha_h_RCS_Source[] = "$Source: /u1/mosfet/RCS/ha.h,v $";
endif ifndef _ha_h
define _ha_h 1 include "conv.h"

ifdef __cplusplus extern "C" void HAencode(float x, float *vector, float start, float step,
                   int n, PCF fun, float sigma);

extern "C" float HAdecode(float *vector, float start, float step, int n);

extern "C" float HAstddev(float *vector, float start, float step, int n);

else extern void HAencode(float x, float *vector, float start, float step, int n,
               PCF fun, float sigma);
```

```
extern float HAdecode(float *vector, float start, float step, int n);

extern float HAstddev(float *vector, float start, float step, int n);

endif endif
``` ha.c

```c
/* -*- C -*- */

/********************************************************************
                ACA Confidential and Proprietary Copyright (c) 1991 Microelectronics and Computer Technology Corporation All Rights Reserved. Shareholders of MCC may reproduce and distribute
these materials for internal purposes by retaining MCC's copyright notice,
proprietary legends, and markings on all complete and partial copies.

********************************************************************/

/********************************************************************
James A. Pittman ha.c February, 1991

HyperAcuity

Three functions to encode and decode a quantity into a vector of
activations and back, and to judge the quality of an encoding.

This was written assuming ANSI C.

********************************************************************/
/*    $Author: nnetadm $ */
/*    $Date: 1991/09/13 19:29:25 $ */
/*    $Source: /u1/mosfet/RCS/ha.c,v $ */
/*    $Revision: 1.1 $ */
/*    $State: Exp $ */
/*    $Log: ha.c,v $
 * Revision 1.1  1991/09/13  19:29:25  nnetadm
 * Initial revision
 *
 *
 */ ifndef lint
static char ha_c_RCS_Id[] =     "$Id: ha.c,v 1.1 1991/09/13 19:29:25 nnetadm Exp mosfet $";
static char ha_c_RCS_Source[] = "$Source: /u1/mosfet/RCS/ha.c,v $";
endif include "conv.h"

void HAencode(float x, float *vector, float start, float step, int n, PCF fun,
              float sigma)
{
  int i;
  float y;
  for(i = 0, y = start; i < n; i++, y += step)
    vector[i] = fun(x - y, sigma);
} float HAdecode(float *vector, float start, float step, int n)
{
  int i;
  float y;
  float scale = 0.0;
  float sum = 0.0;
  for(i = 0, y = start; i < n; i++, y += step)
    {
```

```
      scale += vector[i];
      sum += vector[i] * y;
    }
  if (scale) return sum / scale;
  else return start + step * (((float)n / 2.0) - 0.5);
} float HAstddev(float *vector, float start, float step, int n)
{
  int i;
  float y, delta;
  float scale = 0.0;
  float mean = 0.0;
  float sum = 0.0;

for(i = 0, y = start; i < n; i++, y += step)
    {
      scale += vector[i];
      mean += vector[i] * y;
    }
  scale = 1.0 / scale;
  mean *= scale;

for(i = 0, y = start; i < n; i++, y += step)
    {
      delta = vector[i] * scale * (y - mean);
      sum += delta * delta;
    }
  return (float)sqrt((double)(sum / (float)n));
}
``` conv.h

```c
/* -*- C -*- */
```

/****************************************************************************

ACA Confidential and Proprietary

Copyright (c) 1991 Microelectronics and Computer Technology Corporation

All Rights Reserved. Shareholders of MCC may reproduce and distribute
these materials for internal purposes by retaining MCC's copyright notice,
proprietary legends, and markings on all complete and partial copies.

*****************************************************************************/

/****************************************************************************

James A. Pittman conv.h

February, 1991

Convolving functions

These are functions that are high at a quantity, and drop off to zero
as one moves away from that quantity either going up or going down.
We assume they all have 2 args: the quantity (x) and another parameter
that scales the width of the function (sigma).

This was written assuming ANSI C.

*****************************************************************************/

```c
/* $Author: mosfet $ */
/* $Date: 1991/10/22 15:12:39 $ */
/* $Source: /u45/mosfet/RCS/conv.h,v $ */
/* $Revision: 1.2 $ */
/* $State: Exp $ */
/* $Log: conv.h,v $
// Revision 1.2  1991/10/22  15:12:39  mosfet
// *** empty log message ***
//
 * Revision 1.1  1991/09/13  19:28:43  nnetadm
 * Initial revision
 *
 */ ifndef lint
static char conv_h_RCS_Id[] = "$Id: conv.h,v 1.2 1991/10/22 15:12:39 mosfet Exp $";
static char conv_h_RCS_Source[] = "$Source: /u45/mosfet/RCS/conv.h,v $";
endif ifndef _conv_h
define _conv_h 1 typedef float (*PCF) (float, float);

ifdef __cplusplus extern "C" float gaussian(float x, float sigma);
extern "C" float sinc(float x, float sigma);
extern "C" float circle(float x, float sigma);
extern "C" float parabolic(float x, float sigma);
extern "C" float square_wave(float x, float sigma);
```

```
extern "C" float triangle(float x, float sigma);

extern "C" PCF atocf(char *name);

else extern float gaussian(float x, float sigma);
extern float sinc(float x, float sigma);
extern float circle(float x, float sigma);
extern float parabolic(float x, float sigma);
extern float square_wave(float x, float sigma);
extern float triangle(float x, float sigma);

extern PCF atocf(char *name);

endif define CONV_FUNCTIONS "gaussian, sinc, circle, parabolic, square, or triangle"

endif
``` conv.c

```c
/* -*- C -*- */

/*************************************************************************

ACA Confidential and Proprietary

Copyright (c) 1991 Microelectronics and Computer Technology Corporation

All Rights Reserved. Shareholders of MCC may reproduce and distribute
these materials for internal purposes by retaining MCC's copyright notice,
proprietary legends, and markings on all complete and partial copies.

**************************************************************************/

/*************************************************************************

James A. Pittman conv.c

February, 1991

Convolving functions

These are functions that are high at a quantity, and drop off to zero
as one moves away from that quantity either going up or going down.
We assume they all have 2 args: the quantity (x) and another parameter
that scales the width of the function (sigma).

This was written assuming ANSI C.

**************************************************************************/

/* $Author: mosfet $ */
/* $Date: 1991/10/22 15:12:16 $ */
/* $Source: /u45/mosfet/RCS/conv.c,v $ */
/* $Revision: 1.2 $ */
/* $State: Exp $ */
/* $Log: conv.c,v $
 * Revision 1.2  1991/10/22  15:12:16  mosfet
 * *** empty log message ***
 *
 * Revision 1.1  1991/09/13  19:28:11  nnetadm
 * Initial revision
 *
 */ ifndef lint
static char conv_c_RCS_Id[] = "$Id: conv.c,v 1.2 1991/10/22 15:12:16 mosfet Exp $";
static char conv_c_RCS_Source[] = "$Source: /u45/mosfet/RCS/conv.c,v $";
endif include <stdio.h>
include <math.h>
#include "conv.h"

const float pi = (float)M_PI;

const float sqrt_of_two_pi = 2.5066283;

/* Function is a bell-shaped curve. With a sigma of 1.0, function is
   0.39894228 at 0.0, dropping off to 0.24197072 at sigma, 0.053990966
   at 2 sigma. If sigma is doubled, the function at 0.0 is halved, and
   the tails spread out. If sigma is halved, the function at 0.0 is
```

```
    doubled, and the tails pull in.
*/ float gaussian(float x, float sigma)
{
  float xs = x / sigma;
  return exp(-(xs * xs / 2.0)) / (sigma * sqrt_of_two_pi);
}

/* Function is 1.0 at 0.0, and 0.0 at +/- sigma, +/- 2sigma, etc.
   Between these multiples of sigma it alternates between positive
   values and negative values.
   */ float sinc(float x, float sigma)
{
    if(x==0.0) return 1.0;
    else
    {
        float scaled = x * pi / sigma;
        return (float)(sin(scaled)) / scaled;
    }
}

/* Function is 1.0 at 0.0, 0.0 at +/- sigma and beyond, and a perfect
   half circle between. */ float circle(float x, float sigma)
{
  if (sigma < (float)fabs((double)x)) return 0.0;
  return (float)cos(x / sigma * 0.63661977);
}

/* Function is 1.0 at 0.0, 0.0 at +/- sigma and beyond, and an upside-down
   parabola between.  The parabola is obtained by squaring x. */ float parabolic(float x, float sigma)
{
  x = x / sigma;
  x = x * x;
  if (1.0 < x) return 0.0;
  return 1.0 - (x * x);
}

/* Function is 1.0 within +/- sigma (inclusive), and 0.0 beyond.
   */ float square_wave(float x, float sigma)
{
  return ((float)fabs((double)x) < sigma) ? 1.0 : 0.0;
}

/* Function is 1.0 at 0.0, 0.0 at +/- sigma or beyond, and a straight
   line between.
   */ float triangle(float x, float sigma)
{
  float xs = ((float)fabs((double)x)) / sigma;
  if (1.0 < xs) return 0.0;
  return 1.0 - xs;
}

PCF atocf(char *name)
``` conv.c

```
{
  if (!strcmp(name, "gaussian")) return gaussian;
  if (!strcmp(name, "sinc")) return sinc;
  if (!strcmp(name, "circle")) return circle;
  if (!strcmp(name, "parabolic")) return parabolic;
  if (!strcmp(name, "square")) return square_wave;
  if (!strcmp(name, "triangle")) return triangle;
  fputs("Invalid convolving funtion specified, must use one of ", stderr);
  fputs(CONV_FUNCTIONS, stderr);
  fputs(".  Defaulting to gaussian.\n", stderr);
  return gaussian;
}
```

What is claimed is:

1. A multi-layered neural network for pattern recognition, comprising:

an input layer for mapping into a two-dimensional scan window, said scan window defining an input space that can be scanned over objects, and which input contains at least two adjacent ones of said objects;

an output layer comprised of at least a first output node with an associated activation energy that is activated to represent the presence of a desired object substantially centered in said scan window, the activation energy thereof having a variable level, which level represents the proximity of the object to the substantial center of said scan window, and a second output node with an associated activation energy that is activated to represent a desired distance from a frame of reference in said scan window to another and adjacent one of said objects when the activation energy thereof is raised above a predetermined threshold; and a hidden layer having local receptor fields and interconnected with said input layer and said output layer for mapping said input layer to said output layer, said hidden layer providing a representation of the position of the desired one of said objects relative to the substantial center of said scan window such that said first output node is activated in response thereto, said hidden layer providing a representation of the desired distance when the adjacent one of said objects is separated from said frame of reference in said scan window by substantially said desired distance such that said second output node is activated in response thereto.

2. The neural network of claim 1, wherein said output layer comprises a plurality of said first output nodes each with associated activation energies and each corresponding to a plurality of said objects which exist in a predetermined sequence, and which objects can be disposed adjacent each other and overlapping, and wherein said hidden layer contains a representation of the position of each of said objects relative to the substantial center of said scan window, such that when any of said objects are disposed within said scan window, activation of the associated one of said first output nodes results.

3. The neural network of claim 2, wherein an additional first output node is provided in said output layer representing the presence of the center between two adjacent ones of said objects, and said hidden layer contains the representation of the center between said two adjacent objects when substantially centered within said scan window.

4. The neural network of claim 2, wherein said plurality of objects comprise letters of the alphabet.

5. The neural network of claim 2, wherein said plurality of objects comprise numbers from "0" through "9".

6. The neural network of claim 1, wherein said output layer comprises a plurality of said second output nodes each corresponding to a plurality of desired distances between said frame of reference and one of said objects within said scan window, and with said desired distances being different along a single dimension, and wherein said hidden layer contains a representation of each of said desired distances, such that when any of said desired distances exist between said frame of reference and one of said objects within said scan window, activation of the associated one of said second output nodes results.

7. The neural network of claim 6, wherein the activation energy for each of said second nodes varies in intensity from a maximum at the desired distance associated with said second output node to a minimum at a predetermined distance on either side of said desired distance in accordance with a predetermined profile such that a distance less than or greater than said associated desired distance results in an activation energy that is lower than the maximum.

8. The neural network of claim 7, wherein the activation energy curve for each of said second output nodes is associated with distances that overlap distances associated with the activation energy of other of said second output nodes.

9. The neural network of claim 1, wherein said frame of reference is the substantial center of said scan window.

10. The neural network of claim 1, wherein said representations of the desired one of said objects and the desired distance are learned by backpropagation learning techniques.

11. The neural network of claim 1, wherein said hidden layer comprises a first hidden layer having local receptor fields having shared weights and a second hidden layer having local receptor fields and no shared weights.

12. The neural network of claim 1, wherein said objects in said scan window are normalized in size to said scan window.

13. A multi-layered neural network system for pattern recognition, comprising:

an input field containing a plurality of adjacently disposed objects;

a scanning mechanism for generating a two-dimensional scan window and scanning said scan window over said objects such that said scan window contains at least two of said adjacent objects;

an input layer for mapping into said two-dimensional scan window;

an output layer comprised of at least a first output node with an associated activation energy that is activated to represent the presence of a desired one of said objects substantially centered in said scan window, the activation energy thereof, and a second output node with an associated activation energy that is activated to represent a desired distance from a frame of reference in said scan window to another and adjacent one of said objects when the activation energy is raised above a predetermined threshold;

a hidden layer having local receptor fields and interconnected with said input layer and said output layer for mapping said input layer to said output layer, said hidden layer providing a representation of this position of the desired object relative to the substantial center of said scan window such that said first output node is activated in response thereto, said hidden layer providing a representation of the desired distance when said adjacent object is separated from said frame of reference in said scan window by substantially said desired distance such that said second output node is activated in response thereto; and a processor for receiving the output of said first output node and recognizing when the first output node is activated indicating the presence of said desired object centered in said scan window and providing an output in response thereto, and said processor operable to receive said second output node and controlling said scanning mechanism to move by a distance substantially corresponding to said associated desired distance when said second node is activated.

14. The neural network system of claim 13, wherein said output layer comprises a plurality of said first output nodes each with an associated activation energy and each corresponding to one of said plurality of objects which exist in a predetermined sequence, and which objects can be disposed adjacent each other and overlapping, and wherein said hidden layer contains a representation of the position of each of said objects relative to the substantial center of said scan window, such that when any of said objects is disposed within said scan window, activation of the associated one of said first output nodes results, said processor operable to receive the output of all of said first output nodes and recognize when any of said first output nodes is activated and then selectively generate a separate output for each of said first output nodes in response thereto.

15. The neural network system of claim 14, wherein an additional first output node is provided in said output layer representing the presence of the center between two adjacent ones of said objects, and said hidden layer contains the representation of the center between said two adjacent objects when substantially centered within said scan window.

16. The neural network system of claim 13, wherein said plurality of objects comprise letters of the alphabet.

17. The neural network system of claim 13, wherein said plurality of objects comprise numbers from "0" through "9".

18. The neural network system of claim 13, wherein said output layer comprises a plurality of said second output nodes each corresponding to a plurality of desired distances between said frame of reference and one of said objects within said scan window, and with said desired distances being different along a single dimension, and wherein said hidden layer contains a representation of each of said desired distances, such that when any of said desired distances exist between said frame of reference and an object within said scan window, activation of the associated one of said second output nodes results, said processor operable to receive the output of all of said second output nodes and recognize when any one of said second output nodes is activated, said processor controlling said scanning mechanism to move said scan window by a distance corresponding to the desired distance associated with the activated one of said second output nodes.

19. The neural network system of claim 18, wherein the activation energy for each of said second nodes varies in intensity from a maximum at the desired distance associated with said second output node to a minimum at a predetermined distance on either side of said desired distance in accordance with a predetermined profile such that a distance less than or greater than said associated desired distance results in an activation energy that is lower than the maximum.

20. The neural network system of claim 19, wherein the activation energy curve for each of said second output nodes is associated with distances that overlap distances associated with the activation energy of other of said second output nodes.

21. The neural network system of claim 13, wherein said frame of reference is the substantial center of said scan window.

22. The neural network system of claim 13, wherein said representations of the desired one of said objects and the desired distance are learned by backpropagation learning techniques.

23. The neural network system of claim 13, wherein said hidden layer comprises a first hidden layer having local receptor fields having shared weights and a second hidden layer having local receptor fields and no shared weights.

24. The neural network system of claim 13, wherein said objects in said scan window are normalized in size to said scan window.

25. A method for recognizing a pattern, comprising:

providing an input layer in a neural network;

mapping the input layer into a two dimensional scan window, the scan window defining an input space that can be scanned over objects, and which scan window can contain at least two adjacent ones of the objects;

providing an output layer in the neural network having at least a first output node with an associated activation energy that is operable to be activated to represent the presence of a desired one of the objects relative to the substantial center of the scan window and a second output node with an associated activation energy that is activated to represent a desired distance between the frame of reference within the scan window and the one of the objects not substantially centered in the scan window;

the first and second output nodes activated when the associated activation energies rise above respective predetermined thresholds;

providing a hidden layer in the neural network and interconnecting the hidden layer with the input layer and the output layer;

mapping the input layer to the output layer with the hidden layer, the hidden layer providing a representation of the position of the desired one of the objects relative to the substantial center of the scan window, and providing a representation of the desired distance when the desired one of the objects not substantially centered in the scan window is separated from the frame of reference by substantially the desired distance;

activating the first output node in response to the desired one of the objects being disposed within the scan window and substantially corresponding to the representation in the hidden layer; and activating the second output node when the distance from the frame of reference to the one of the objects not substantially centered in the scan window is substantially equal to the desired distance.

26. The method of claim 25, wherein the output layer comprises a plurality of first output nodes, each with associated activation energies, that correspond to a plurality of objects that exist in a predetermined sequence, and which objects can be disposed adjacent to each other and overlapping and comprising the steps of:

storing representations of each of the plurality of objects in the hidden layer that each represent position of the associated object relative to the substantial center of the scan window;

each of the representations associated with one of the plurality of first output nodes; and activating the associated one of the first output nodes when the associated one of the objects or a substantially similar representation thereof is disposed within the scan window.

27. The method of claim 26 and further comprising:

providing an additional first output node with an associated activation energy in the output layer;

storing in the hidden layer a representation of the presence of the center between two of the objects; and activating the additional output node when the center between the two of the objects, corresponding to the stored representation of the center between the two of the objects, is disposed in substantially the center of the scan window.

28. The method of claim 25 wherein the frame of reference is the substantial center of the scan window.

29. The method of claim 25, wherein the plurality of objects comprises letters of the alphabet.

30. The method of claim 25 and further comprising training the neural network through backpropagation learning techniques to store the representations of the desired object and the desired distance in the hidden layer.

31. The method of claim 25, wherein the step of providing the hidden layer comprises:

providing a first hidden layer having local receptor fields, having shared weights; and providing a second hidden layer having local receptor fields and no shared weights.

32. The method of claim 25 and further comprising normalizing objects that are disposed within the scan window to a normalized size.

33. The method of claim 25, wherein the output layer comprises a plurality of second output nodes, each having an associated activation energy, each second output node corresponding to one of a plurality of desired distances that exist between the frame of reference and one of a plurality of objects, the desired distances being different, and comprising the steps of:

storing representations of each of the desired distances in the hidden layer that represent the desired distances;

each of the representations associated with one of the second output nodes; and activating the associated one with the second output nodes when one of the objects disposed in the scan window is separated from the frame of reference by substantially the associated desired distance.

34. A method for recognizing a pattern, comprising:

providing an input layer in a neural network;

mapping the input layer into the scan window;

providing an output layer in the neural network having at least a first output node with an associated activation energy that is activated to represent the presence of a desired object in the scan window and the position thereof relative to the substantial center of the scan window and a second output node with an associated activation energy that is activated to represent a desired distance between the frame of reference within the scan window and the one of the objects not substantially centered in the scan window;

providing a hidden layer in the neural network and interconnecting the hidden layer with the input layer and the output layer;

mapping the input layer to the output layer with the hidden layer, the hidden layer providing a representation of the position of the desired object relative to the substantial center of the scan window, and providing a representation of the desired distance when the object not substantially centered in the scan window is separated from the frame of reference by substantially the desired distance;

activating the first output node by raising its associated activation energy to a level representing the position of the desired object relative to the substantial center of the scan window in response to the desired object being disposed in of the scan window and substantially corresponding to the representation in the hidden layer;

activating the second output node by raising its associated activation energy above a predetermined threshold when the distance from the frame of reference to the one of the objects not substantially centered in the scan window is substantially equal to the desired distance; and moving the scan window by a distance substantially corresponding to the desired distance associated with the second output node after activation of both the first and second output nodes.

35. The method of claim 34, wherein the output layer comprises a plurality of first output nodes, each with associated activation energies, that correspond to the plurality of objects that exist in a predetermined sequence, and which objects can be disposed adjacent to each other and overlapping and comprising the steps of:

storing representations of each of the plurality of objects in the hidden layer that each represent the position of the associated object relative to the substantial center of the scan window;

each of the representations associated with one of the plurality of first output nodes; and activating the associated one of the first output nodes when the associated one of the objects or a substantially similar representation thereof is substantially centered in the scan window.

36. The method of claim 35 and further comprising:

providing an additional first output node with an associated activation energy in the output layer;

storing in the hidden layer a representation of the presence of the center between two of the plurality of objects; and activating the additional output node when the center between the two of the plurality of objects, corresponding to the stored representation of the center between the two of the plurality of objects, is disposed in substantially the center of the scan window.

37. The method of claim 34 wherein the frame of reference is the substantial center of the scan window.

38. The method of claim 34 and further comprising training the neural network through backpropagation learning techniques to store the representations of the desired object and the desired distance in the hidden layer.

39. The method of claim 34 and further comprising normalizing objects that are disposed within the scan window to a normalized size.

* * * * *